US012456038B2

(12) United States Patent
Lin et al.

(10) Patent No.: US 12,456,038 B2
(45) Date of Patent: Oct. 28, 2025

(54) COMPUTING CIRCUIT AND DATA PROCESSING METHOD BASED ON CONVOLUTIONAL NEURAL NETWORK AND COMPUTER READABLE STORAGE MEDIUM

(71) Applicant: GENESYS LOGIC, INC., New Taipei (TW)

(72) Inventors: Wen-Hsiang Lin, New Taipei (TW); Wei-Zheng Pan, New Taipei (TW); Jin-Min Lin, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 956 days.

(21) Appl. No.: 17/578,416

(22) Filed: Jan. 18, 2022

(65) Prior Publication Data
US 2022/0230055 A1 Jul. 21, 2022

Related U.S. Application Data

(60) Provisional application No. 63/139,809, filed on Jan. 21, 2021.

(30) Foreign Application Priority Data

Nov. 1, 2021 (TW) .................. 110140625

(51) Int. Cl.
*G06N 3/06* (2006.01)
*G06F 9/50* (2006.01)
*G06N 20/20* (2019.01)

(52) U.S. Cl.
CPC ............. *G06N 3/06* (2013.01); *G06F 9/5016* (2013.01); *G06F 9/505* (2013.01)

(58) Field of Classification Search
CPC .......... G06N 3/06; G06N 20/20; G06F 9/505; G06F 9/5016
See application file for complete search history.

(56) References Cited

U.S. PATENT DOCUMENTS 5,630,067 A * 5/1997 Kindell ................. G06F 9/5011
725/74
10,789,505 B2 9/2020 Shacham et al.
(Continued)

FOREIGN PATENT DOCUMENTS

CN 1901548 A * 1/2007
CN 108108811 6/2018
(Continued)

OTHER PUBLICATIONS

Akshay Dua, etc., "Systolic-CNN: An OpenCL-defined Scalable Run-time-flexible FPGA Accelerator Architecture for Accelerating Convolutional Neural Network Inference in Cloud/Edge Computing", published in arXiv as of Dec. 6, 2020, retrieved Mar. 13, 2025. (Year: 2020).*

(Continued)

Primary Examiner — Shourjo Dasgupta
(74) Attorney, Agent, or Firm — JCIPRNET

(57) ABSTRACT

A computing circuit and a data processing method based on a convolutional neural network and a computer readable storage medium are provided. Input data is obtained from a memory. A first computation is performed on first part data of the input data to obtain first output data. The first output data is buffered in a first buffer. When the buffered first output data is greater than a first predetermined data amount, a second computation is performed on the first output data to obtain second output data. The second output data is buffered in a second buffer. Third output data obtained by performing a third computation on the second output data is output to the memory. When performing the second com- (Continued)

putation on the first output data, the first computation is continuously performed on the input data. Accordingly, the number of accesses of the memory can be reduced.

13 Claims, 20 Drawing Sheets

(56) References Cited

U.S. PATENT DOCUMENTS

| | | | | |
|---|---|---|---|---|
| 2007/0070762 | A1* | 3/2007 | Wu | G11B 20/10527 |
| 2019/0147318 | A1 | 5/2019 | Howard et al. | |
| 2019/0197083 | A1* | 6/2019 | Chen | G06N 3/063 |
| 2019/0236049 | A1* | 8/2019 | Vantrease | G06F 17/16 |
| 2019/0244106 | A1* | 8/2019 | Franca-Neto | G06N 3/063 |
| 2019/0311243 | A1* | 10/2019 | Whatmough | G06N 3/045 |
| 2020/0050582 | A1* | 2/2020 | Vantrease | G06N 3/045 |
| 2020/0090030 | A1* | 3/2020 | Huang | G06N 3/04 |

FOREIGN PATENT DOCUMENTS

| | | | | |
|---|---|---|---|---|
| CN | 109740732 | | 5/2019 | |
| CN | 110263925 | | 9/2019 | |
| CN | 110647978 A | * | 1/2020 | G06N 3/045 |
| CN | 109328361 B | * | 3/2020 | G06N 3/0454 |
| CN | 110516801 B | * | 4/2022 | G06F 15/781 |
| CN | 111008697 A | * | 4/2022 | G06N 3/0454 |
| CN | 109934339 B | * | 5/2023 | |
| TW | 202013262 | | 4/2020 | |
| TW | I716108 | | 1/2021 | |
| WO | WO-2019164237 A1 | * | 8/2019 | G06N 3/04 |
| WO | WO-2020221200 A1 | * | 11/2020 | G06F 16/55 |

OTHER PUBLICATIONS

Yunfei Cao, etc., "FPGA-based accelerator for convolution operations", published via 2019 IEEE International Conference on Signal, Information and Data Processing (ICSIDP), Congqing, China, Dec. 11-13, 2019, retrieved Mar. 13, 2025. (Year: 2019).*

Jason Brownlee, "Convolutional Neural Network Model Innovations for Image Classification", published Jul. 5, 2019 to https://machinelearningmastery.com/review-of-architectural-innovations-for-convolutional-neural-networks-for-imageclassification, retrieved Mar. 13, 2025. (Year: 2019).*

Kevin Stehle, etc., "On the Difficulty of Designing Processor Arrays for Deep Neural Networks", published in arXiv as of Jun. 24, 2020, retrieved Mar. 13, 2025. (Year: 2020).*

Manu Suryavansh, "How to make your own deep learning accelerator chip!", published Oct. 18, 2019 to https://medium.com/data-science/how-to-make-your-own-deep-learning-accelerator-chip-1ff69b78ece4, retrieved Mar. 13, 2025. (Year: 2019).*

Kevin Kiningham, etc., "Design and Analysis of a Hardware CNN Accelerator", published 2017, retrieved from https://cs231n.stanford.edu/reports/2017/pdfs/116.pdf on Mar. 13, 2025. (Year: 2017).*

Yufeng Li, etc., "High-performance Convolutional Neural Network Accelerator Based on Systolic Arrays and Quantization", published via 2019 IEEE 4th International Conference on Signal and Image Processing, Jul. 19-21, 2019, Wuxi, China, retrieved Mar. 13, 2025. (Year: 2019).*

Yongming Shen, etc., "Escher: A Cnn Accelerator with Flexible Buffering to Minimize Off-Chip Transfer", published 2017, retrieved from https://compas.cs.stonybrook.edu/~yoshen/FCCM17_Escher_A_CNN_Accelerator_with_Flexible_Buffering_to_Minimize_Off-Chip_Transfer.pdf on Mar. 13, 2025. (Year: 2017).*

Yiran Chen, etc., "A Survey of Accelerator Architectures for Deep Neural Networks", published via Engineering 6 (2020) 264-274, retrieved Mar. 13, 2025. (Year: 2020).*

Bing Liu, etc., "An FPGA-Based CNN Accelerator Integrating Depthwise Separable Convolution", published via Electronics 2019, 8, 281, retrieved Mar. 13, 2025. (Year: 2019).*

Xuechao Wei, "Automated Systolic Array Architecture Synthesis for High Throughput CNN Inference on FPGAs", published via DAC '17, Jun. 18-22, 2017, Austin, TX, USA, retrieved Mar. 13, 2025. (Year: 2017).*

"Office Action of Taiwan Counterpart Application", issued on Sep. 26, 2022, p. 1-p. 10.

"Office Action of China Counterpart Application", issued on Feb. 21, 2025, p. 1-p. 7.

* cited by examiner

COMPUTING CIRCUIT AND DATA PROCESSING METHOD BASED ON CONVOLUTIONAL NEURAL NETWORK AND COMPUTER READABLE STORAGE MEDIUM

CROSS-REFERENCE TO RELATED APPLICATION

This application claims the priority benefit of U.S. Provisional Application No. 63/139,809, filed on Jan. 21, 2021 and Taiwan Application No. 110140625, filed on Nov. 1, 2021. The entirety of each of the above-mentioned patent applications is hereby incorporated by reference herein and made a part of this specification.

BACKGROUND

Technical Field

The disclosure relates to a machine learning (ML) technology, and particularly relates to a computing circuit and a data processing method based on a convolutional neural network (CNN) and a computer readable storage medium.

Description of Related Art

Machine learning is an important topic in artificial intelligence (AI), and training samples may be analyzed to obtain rules therefrom, so as to predict unknown data through the rules. A machine learning model constructed after learning is used to infer data to be evaluated.

There are many types of algorithms for machine learning. For example, a neural network may make decisions through simulating the operation of human brain cells. The convolutional neural network provides better results in terms of image and voice recognition and has gradually become one of the widely applied and mainly researched and developed machine learning architectures.

It is worth noting that in the convolutional layer of the convolutional neural network architecture, a processing element slides a convolution kernel or a filter on input data and executes a specific computation. The processing element needs to repeatedly read the input data and a weight value from a memory and output a computation result to the memory. Furthermore, if different convolutional layers adopt convolution kernels with different sizes or different convolution computations, the number of accesses of the memory will be greatly increased. For example, the Mobile-Net model combines a convolution computation and a depthwise separable convolution computation. Therefore, the computations all need to respectively access the memory.

SUMMARY

The disclosure provides a computing circuit and a data processing method based on a convolutional neural network and a computer readable storage medium, which integrate multiple convolutional layers, so as to reduce the number of accesses of a memory.

A data processing method based on a convolutional neural network of the embodiment of the disclosure includes (but is not limited to) the following steps. Input data is read from a memory. A first computation is performed on first part data of the input data to obtain first output data. The first computation is configured with a first filter. A size of the first output data is related to a size of the first filter of the first computation and a size of the first part data. The first output data is buffered in a first buffer. When the first output data buffered in the first buffer is greater than a first predetermined data amount, a second computation is performed on the first output data to obtain second output data. The second computation is configured with a second filter. A size of the second output data is related to a size of the second filter of the second computation. The second output data is buffered in a second buffer. Third output data obtained by performing a third computation on the second output data is output to the memory. When performing the second computation on the first output data, the first computation is continuously performed on the input data.

A computing circuit based on a convolutional neural network of the embodiment of the disclosure includes (but is not limited to) a memory and a processing element. The memory is used to store input data. The processing element is coupled to the memory and includes first, second, and third computing devices, a first buffer memory, and a second buffer memory. The first computing device is used to perform a first computation on first part data of the input data to obtain first output data, and buffer the first output data to a first buffer memory of the processing element. A size of the first output data is related to a size of a first filter of the first computation and a size of the first part data. The second computing device is used to perform a second computation on second input data when the first output data buffered in the first buffer memory meets a size required for the second computation to obtain second output data, and buffer the second output data to a third memory of the processing element. The second computation is configured with a second filter, and a size of the second output data is related to a size of the second filter of the second computation. The third computing device is used to output third output data obtained by performing a third computation on the second output data to the memory. When the second computing device performs the second computation, the first computing device continuously performs the first computation.

A computer readable storage medium of the embodiment of the disclosure is used to store a program code, and the processor loads the program code to execute the data processing method based on the convolutional neural network.

Based on the above, in the computing circuit and the data processing method based on the convolutional neural network and the computer readable storage medium according to the embodiments of the disclosure, the output data is buffered in the memory in the processing element, and the computation thereof is triggered according to an activation condition of a next computing device (that is, a next computing layer). In this way, the next computing layer may trigger the computation in advance without waiting for a previous computing layer to finish computing all input data. In addition, the embodiments of the disclosure can reduce the number of accesses of the input data from the memory.

In order for the features and advantages of the disclosure to be more comprehensible, the following specific embodiments are described in detail in conjunction with the accompanying drawings.

DETAILED DESCRIPTION OF DISCLOSED EMBODIMENTS

Figure 1:
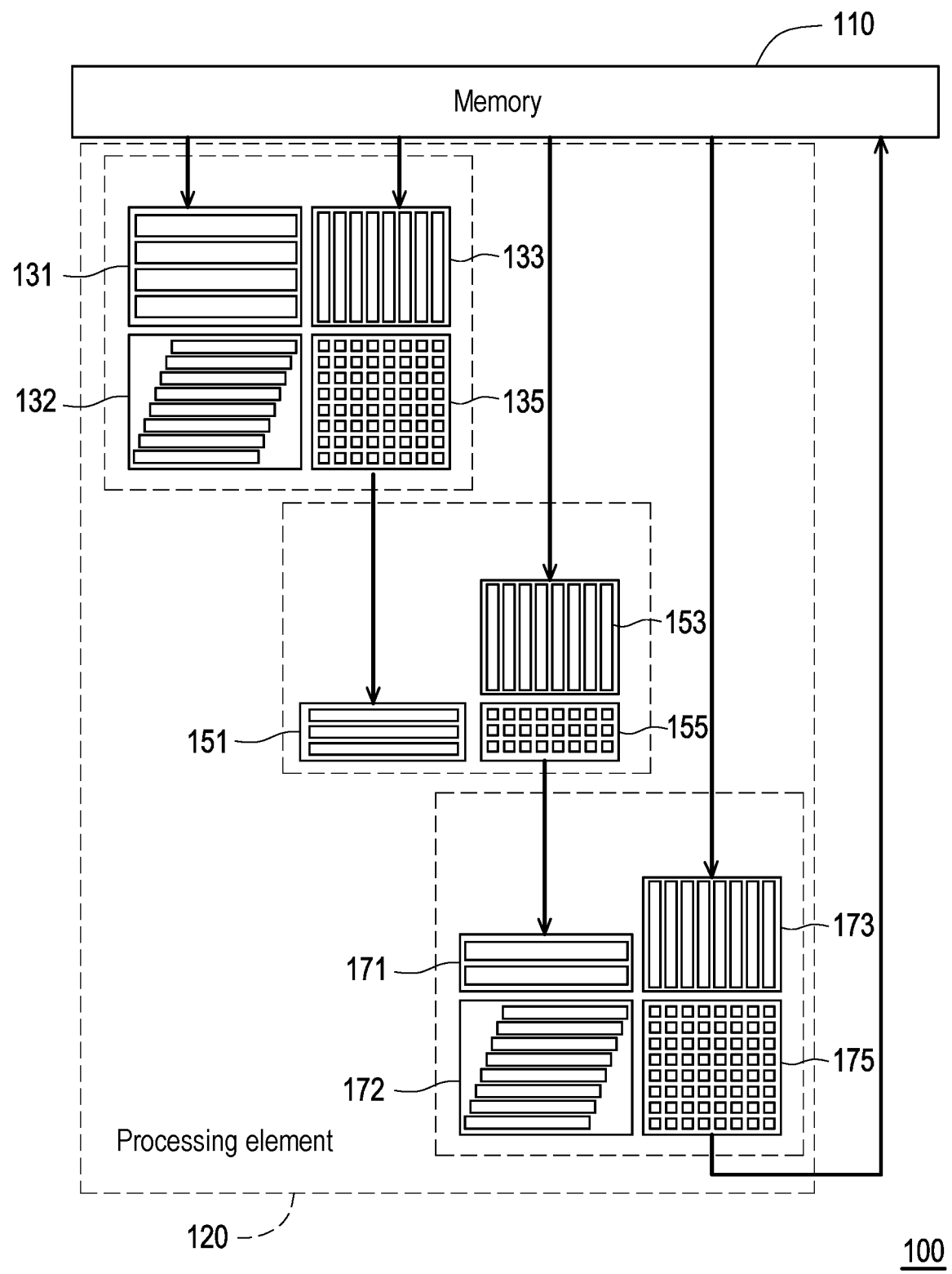
FIG. 1 is a block diagram of elements of a computing circuit based on a convolutional neural network according to an embodiment of the disclosure.

FIG. 1 is a block diagram of elements of a computing circuit 100 based on a convolutional neural network according to an embodiment of the disclosure. Referring to FIG. 1, the computing circuit 100 includes (but is not limited to) a memory 110 and one or more processing elements (PE) 120.

The memory 110 may be a dynamic random access memory (DRAM), a flash memory, a register, a combinational logic circuit, or a combination of the above elements.

The processing element 120 is coupled to the memory 110. The processing elements 120 include (but are not limited to) a feature buffer memory 131, a first input first output (FIFO) unit 132, a first weight buffer memory 133, a first computing device 135, a first buffer memory 151, a second weight buffer memory 153, a second computing device 155, a second buffer memory 171, a second first input first output unit 172, a third weight buffer memory 173, and a third computing device 175.

In an embodiment, the feature buffer memory 131, the first FIFO unit 132, the first weight buffer memory 133, and the first computing device 135 correspond to one layer of convolutional layer/computing layer. In addition, the first computing device 135 is configured with a first filter used in a first computation.

In an embodiment, the feature buffer memory 131 is used to store some or all input data from the memory 110, the first FIFO unit 132 is used to input and/or output data in the feature buffer memory 131 according to a FIFO rule, the first weight buffer memory 133 is used to store one or more weights (forming a first convolution kernel/filter) from the memory 110, and the first computing device 135 is used to perform the first computation. In an embodiment, the first computation is a convolution computation and will be detailed in subsequent embodiment. In another embodiment, the first computation may also be a depthwise separable convolution computation or other types of convolution computations.

In an embodiment, the first buffer memory 151, the second weight buffer memory 153, and the second computing device 155 correspond to one layer of convolutional layer/computing layer. In addition, the second computing device 155 is configured with a second filter used in a second computation.

In an embodiment, the first buffer memory 151 is used to store some or all input data output from the first computing device 135, the second weight buffer memory 153 is used to store one or more weights (forming a second convolution kernel/filter) from the memory 110, and the second computing device 155 is used to perform the second computation. In an embodiment, the second computation is a depthwise convolution computation and will be detailed in subsequent embodiment. In another embodiment, the second computation may also be a convolution computation or other types of convolution computations.

In an embodiment, the second buffer memory 171, the second FIFO unit 172, the third weight buffer memory 173, and the third computing device 175 correspond to one layer of convolutional layer/computing layer. In addition, the third computing device 175 is configured with a third filter used in a third computation.

In an embodiment, the second buffer memory 171 is used to store some or all input data output from the second computing device 155, the second FIFO unit 172 is used to input and/or output data in the second buffer memory 171 according to the FIFO rule, the third weight buffer memory 173 is used to store one or more weights (forming a third convolution kernel/filter) from the memory 110, and the third computing device 175 is used to perform the third computation. In an embodiment, the third computation is a pointwise convolution computation and will be detailed in subsequent embodiment. In another embodiment, the third computation may also be a convolution computation or other types of convolution computations.

In an embodiment, the feature buffer memory 131, the first buffer memory, the second buffer memory, the first weight buffer memory 133, the second weight buffer memory 153, and the third weight buffer memory 173 may be static random access memories (SRAMs), flash memories, registers, various types of buffers, or combinations of the above elements.

In an embodiment, some or all elements in the computing circuit 100 may form a neural network processing unit (NPU), a system on chip (SoC), or an integrated circuit (IC).

In an embodiment, the first computing device 135 has a first maximum computation amount in a unit time, the second computing device 155 has a second maximum computation amount in the same unit time, and the third computing device 175 has a third maximum computation amount in the same unit time. The first maximum computation amount is greater than the second maximum computation amount, and the first maximum computation amount is greater than the third maximum computation amount.

Hereinafter, the method according to the embodiment of the disclosure will be illustrated in conjunction with various devices, elements, and modules in the computing circuit 100. Each process of the method may be adjusted according to implementation situations and is not limited thereto.

Figure 2:
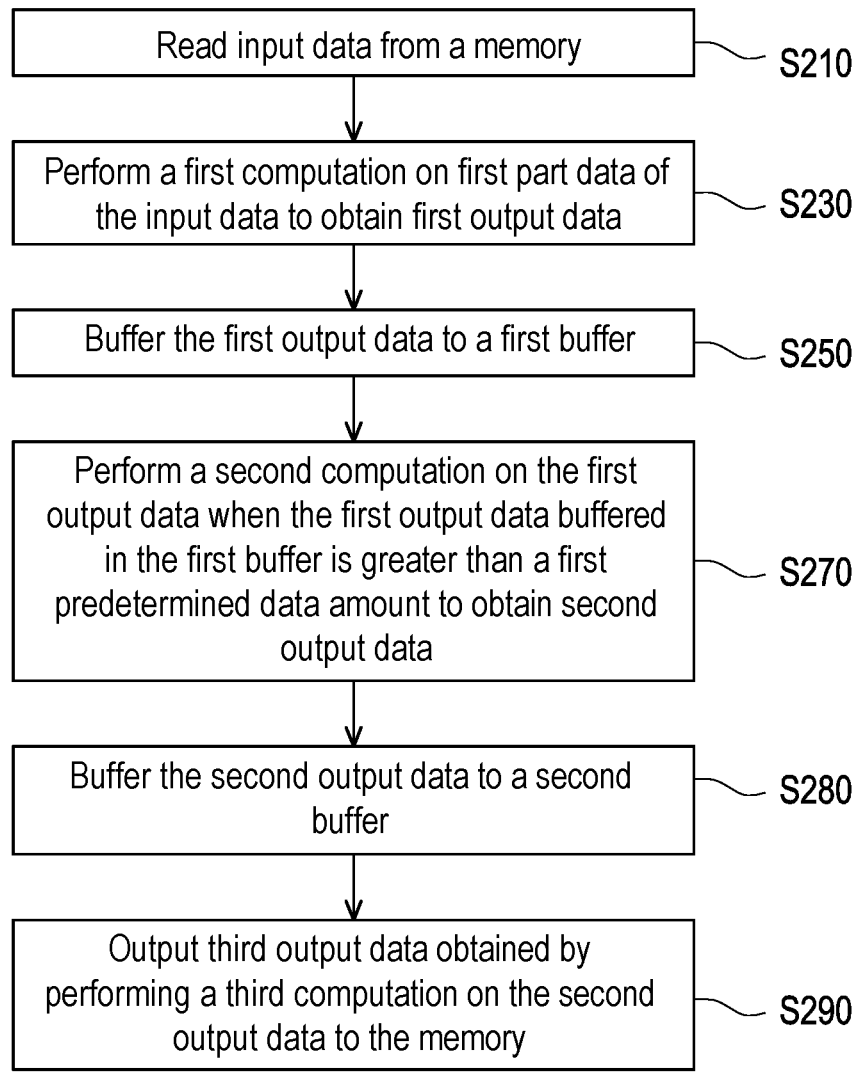
FIG. 2 is a flowchart of a data processing method based on a convolutional neural network according to an embodiment of the disclosure.

FIG. 2 is a flowchart of a data processing method based on a convolutional neural network according to an embodiment of the disclosure. Referring to FIG. 2, the processing element 120 reads the input data from the memory 110 (Step S210). Specifically, the input data may be data (for example, color scale, brightness, or gray scale) of some or all pixels in an image. Alternatively, the input data may also be a data collection related to voice, text, patterns, or other aspects.

There are many ways to read the input data. In an embodiment, the processing element 120 reads all of the input data to serve as first part data. In another embodiment, the processing element 120 reads a part of the input data each time according to a data amount required for the first computation or the capacity of the feature buffer memory 131 to serve as the first part data.

Figure 3:
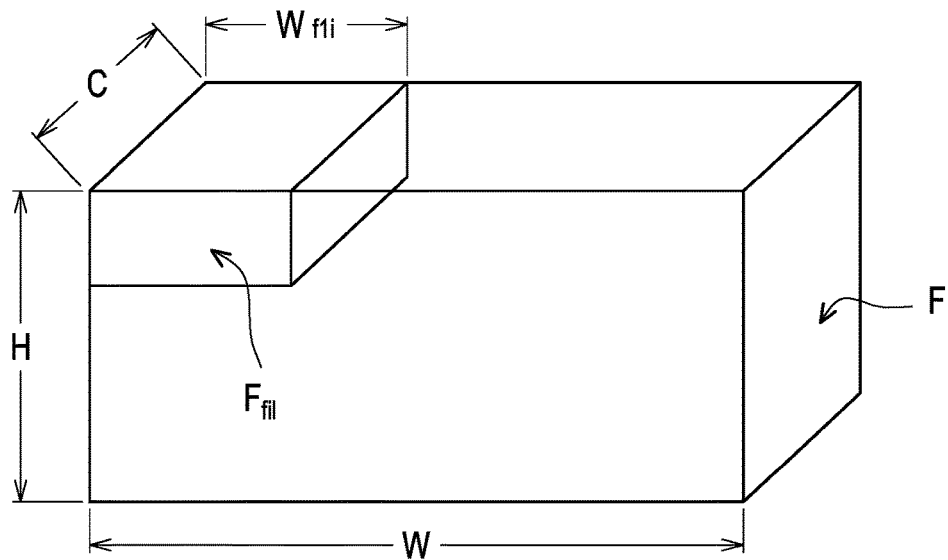
FIG. 3 is a schematic diagram of input data according to an embodiment of the disclosure.

FIG. 3 is a schematic diagram of input data F according to an embodiment of the disclosure. Referring to FIG. 3, it is assumed that the size of the input data F is configured with a height H, a width W, and a channel number C, and the size of first part data $F_{fi1}$ read by the processing element 120 is configured with a height $H_{fi1}$, a width $W_{fi1}$, and the channel number C. The height $H_{fi1}$ may be less than or equal to the height H, and the width $W_{fi1}$ may be less than or equal to the width W.

It should be noted that the input data may be stored in a specific block or position in the memory 110, but the embodiment of the disclosure does not limit the storage position of each element of the input data in the memory 110.

The feature buffer memory 131 stores a part or all of the input data from the memory 110. That is, the feature buffer memory 131 stores the first part data. The first computing device 135 performs the first computation on the first part data of the input data to obtain first output data (Step S230). Specifically, performing the first computation is to perform the first computation (for example, a convolution computation) on the first part data and a corresponding weight. The size of the first output data is related to the size of the first filter of the first computation and the size of the first part data.

Figure 4:
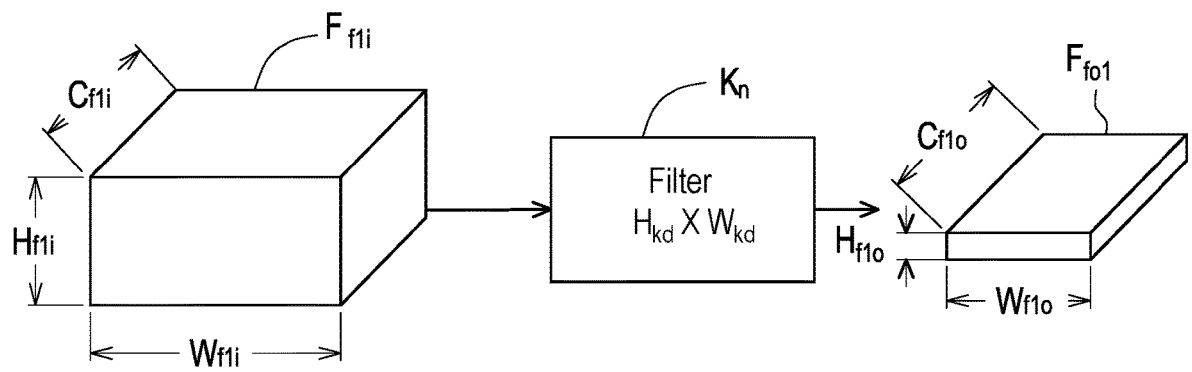
FIG. 4 is a schematic diagram of a first computation according to an embodiment of the disclosure.

For example, FIG. 4 is a schematic diagram of a first computation according to an embodiment of the disclosure. Referring to FIG. 4, the first computation takes a convolution computation as an example. The first part data $F_{fi1}$ (with the size being configured with the height $H_{fi1}$, the width $W_{fi1}$, and the channel number $C_{fi1}$) and a first filter $K_n$ (with the size being configured with a height $H_{kd}$ and a width $W_{kd}$). If the height $H_{fi1}$ is greater than or equal to the height $H_{kd}$ and the width $W_{fi1}$ is greater than or equal to the width $W_{kd}$, the first computing device 135 may trigger the first computation. For a result (that is, first output data $F_{fo1}$) of the first computation, a height $H_{fio}$ is the height $H_{fi1}-H_{kd}+1$, a width $W_{fio}$ is the width $W_{fi1}-W_{kd}+1$, and a channel number $C_{fio}$ is the same as the channel number $C_{fi1}$.

For another example, if the size defined as (height, width, channel number) of the first part data $F_{fi1}$ is (3, 32, 16), and the size defined as (height, width) of the first filter $K_n$ is (3, 3), the size (height, width, channel number) of the first output data $F_{fo1}$ is (1, 30, 16).

In an embodiment, the first computing device 135 adopts a systolic array structure. The first computing device 135 divides the first part data into multiple first systolic array inputs, and respectively performs the first computation on the first systolic array inputs to obtain multiple first systolic array outputs. The size of each first systolic array output is limited by the size of the systolic array. For example, an element number of the first systolic array output is less than or equal to the capacity of the systolic array. In addition, the first systolic array outputs based on the same first part data form the first output data.

Figure 5A:
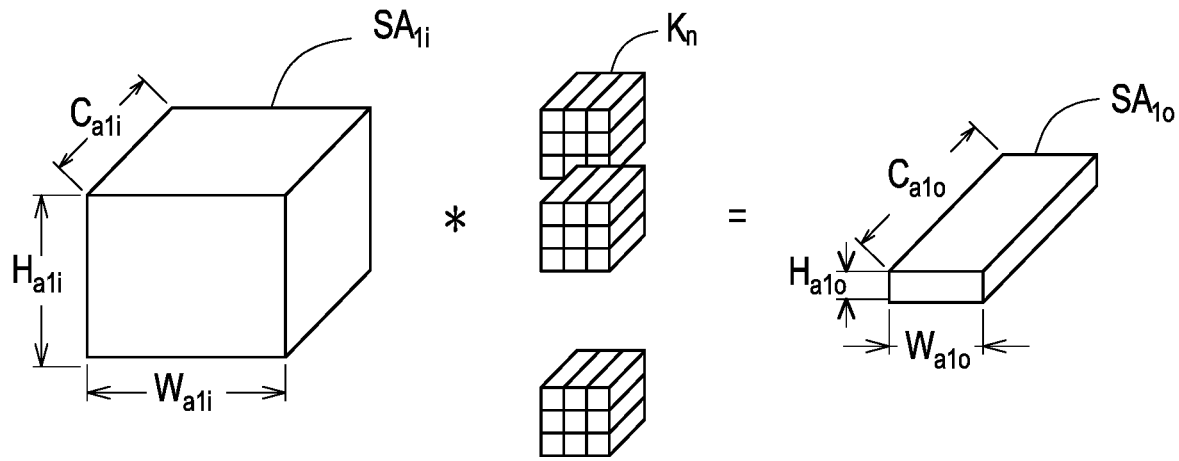
FIG. 5A and FIG. 5B are schematic diagrams of systolic array inputs and outputs according to an embodiment of the disclosure.
Figure 5B:
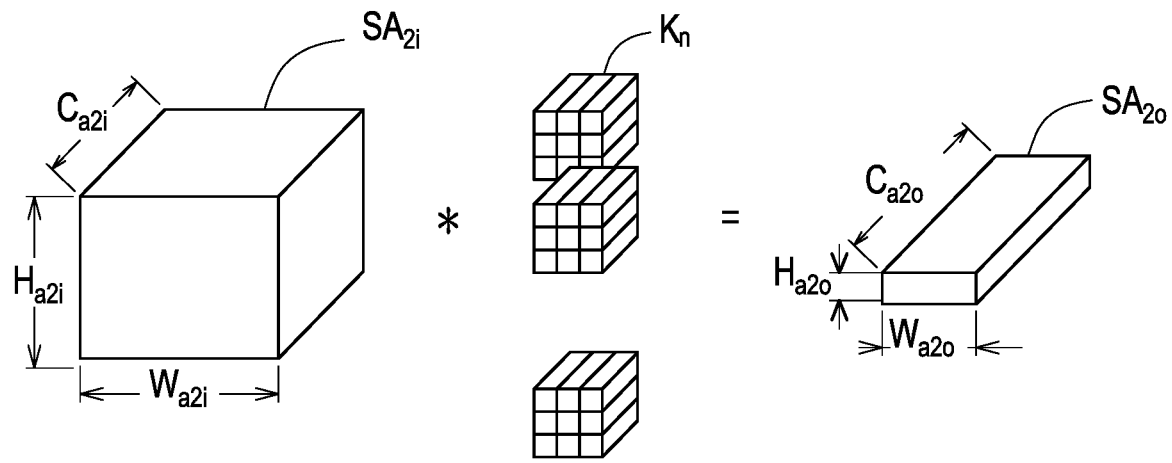

For example, FIG. 5A and FIG. 5B are schematic diagrams of systolic array inputs and outputs according to an embodiment of the disclosure. Referring to FIG. 5A and FIG. 5B, it is assumed that the size of the systolic array is number $M_{sa} \times$ number $N_{sa}$. A height $H_{a1o}$ of a systolic array output $SA_{1o}$ is 1, a width $W_{a1o}$ thereof may be the number $M_{sa}$, and a channel number $C_{a1o}$ thereof may be the number $N_{sa}$. Therefore, the first computing device 135 divides the first part data into a systolic array input $SA_{1i}$ (with the size being configured with a height $H_{a1i}$, a width $W_{a1i}$, and a channel number $C_{a1i}$) and a systolic array input $SA_{2i}$ (with the size being configured with a height $H_{a2i}$, a width $W_{a2i}$, and a channel number $C_{a2i}$). The two systolic array inputs $SA_{1i}$ and $SA_{2i}$ are respectively performed with convolution computation with a weight of each channel of the filter $K_n$, so as to obtain the systolic array outputs $SA_{1o}$ and $SA_{2o}$. A height $H_{a2o}$ of the systolic array output $SA_{2o}$ is 1, a width $W_{a2o}$ thereof may be less than or equal to the number $M_{sa}$, and a channel number $C_{a2o}$ thereof may be less than or equal to the number $N_{sa}$.

For another example, the size defined as (height, width, channel number) of the first part data is (3, 32, 16), the size of the systolic array is 16×16, and the size of the filter $K_n$ is 3×3. The height $H_{a1o}$ of the systolic array output $SA_{1o}$ is 1, the width $W_{a1o}$ thereof may be 16, and the channel number $C_{a1o}$ thereof may be 16. In addition, the height $H_{a1i}$ of the systolic array input $SA_{1i}$ is 3, the width $W_{a1i}$ thereof is 18, and the channel number $C_{a1i}$ thereof is 16. On the other hand, after the first computing device 135 distinguishes the systolic array input $SA_{1i}$ from the first part data, the systolic array input $SA_{2i}$ may be obtained. The height $H_{a2i}$ of the systolic array input $SA_{2i}$ is 3, the width $W_{a2i}$ thereof is 16, and the channel number $C_{a2i}$ thereof is 16. In addition, the height $H_{a2o}$ of the systolic array output $SA_{2o}$ is 1, the width $W_{a2o}$ thereof is 14 (that is, the width $W_{a2i}$-the width of the filter $K_n$+1), and the channel number $C_{a2o}$ thereof is 16.

For another example, Table (1) to Table (3) are first, second, and fifteenth data (the remaining data may be deduced by analogy) of the first part data stored in the feature buffer memory 131:

TABLE 1

| I(0, 2, 15) to | I(0, 1, 15) to | I(0, 0, 15) to |
| I(0, 2, 0) | I(0, 1, 0) | I(0, 0, 0) |
| I(1, 2, 15) to | I(1, 1, 15) to | I(1, 0, 15) to |
| I(1, 2, 0) | I(1, 1, 0) | I(1, 0, 0) |

TABLE 1-continued

| I(2, 2, 15) to | I(2, 1, 15) to | I(2, 0, 15) to |
| I(2, 2, 0) | I(2, 1, 0) | I(2, 0, 0) |

TABLE 2

| I(0, 3, 15) to | I(0, 2, 15) to | I(0, 1, 15) to |
| I(0, 2, 0) | I(0, 2, 0) | I(0, 1, 0) |
| I(1, 3, 15) to | I(1, 2, 15) to | I(1, 1, 15) to |
| I(1, 2, 0) | I(1, 2, 0) | I(1, 1, 0) |
| I(2, 3, 15) to | I(2, 2, 15) to | I(2, 1, 15) to |
| I(2, 2, 0) | I(2, 2, 0) | I(2, 1, 0) |

TABLE 3

| I(0, 17, 15) to | I(0, 16, 15) to | I(0, 15, 15) to |
| I(0, 17, 0) | I(0, 16, 0) | I(0, 15, 0) |
| I(1, 17, 15) to | I(1, 16, 15) to | I(1, 15, 15) to |
| I(1, 17, 0) | I(1, 16, 0) | I(1, 15, 0) |
| I(2, 17, 15) to | I(2, 16, 15) to | I(2, 15, 15) to |
| I(2, 17, 0) | I(2, 16, 0) | I(2, 15, 0) |

$I(i1,j1,n1)$ represents values of the input data read at a position (height position i1, width position j1, channel position n1). The first FIFO unit 132 sequentially inputs the data to the first computing device 135 from right to left and from top to bottom of the data.

Table (4) is data of a 3×3 filter with 16 channels used in the convolution computation:

TABLE 4

| Channel 0 | Channel 1 | ... | Channel 14 | Channel 15 |
|---|---|---|---|---|
| $F_{d0}(2, 2, 15)$ | $F_{d1}(2, 2, 15)$ | ... | $F_{d14}(2, 2, 15)$ | $F_{d15}(2, 2, 15)$ |
| ... | ... | ... | ... | ... |
| $F_{d0}(2, 2, 0)$ | $F_{d1}(2, 2, 0)$ | ... | $F_{d14}(2, 2, 0)$ | $F_{d15}(2, 2, 0)$ |
| ... | ... | ... | ... | ... |
| $F_{d0}(0, 0, 0)$ | $F_{d1}(0, 0, 0)$ | ... | $F_{d14}(0, 0, 0)$ | $F_{d15}(0, 0, 0)$ |
| ... | ... | ... | ... | ... |
| $F_{d0}(0, 0, 0)$ | $F_{d1}(2, 2, 15)$ | ... | $F_{d14}(2, 2, 15)$ | $F_{d15}(2, 2, 15)$ |

$F_{dn}(i2,j2,n2)$ represents values of an n-th filter read at a position (height position i2, width position j2, channel position n2).

Table (5) is the systolic array output:

TABLE 5

| A(0,0,0) | A(0,0,1) | ... | A(0,0,14) | A(0,0,15) |
| A(0,1,0) | A(0,1,1) | ... | A(0,1,14) | A(0,1,15) |
| ... | ... | ... | ... | ... |
| A(0,15,0) | A(0,15,1) | ... | A(0,15,14) | A(0,15,15) |

$A(i3,j3,n3)$ represents values of the systolic array output at a position (height position i3, width position j3, channel position n3), and the mathematical expression thereof is:

$$A(i3,j3,n3)=I(i3,j3,0){\times}F_{dn3}(0,0,0)+I(i3,j3,1){\times}F_{dn3}(0,0,1)+\ldots+I(i3,j3,15){\times}F_{dn3}(0,0,15)+I(i3,j3+1,0){\times}F_{dn3}(0,1,0)+I(i3,j3+1,1){\times}F_{dn3}(0,1,1)+\ldots+I(i3,j3+1,15){\times}F_{dn3}(0,1,15)+I(i3,j3+2,0){\times}F_{dn3}(0,2,0)+I(i3,j3+2,1){\times}F_{dn3}(0,2,1)+\ldots+I(i3,j3+2,15){\times}F_{dn3}(0,2,15)+I(i3+1,j3,0){\times}F_{dn3}(1,0,0)+I(i3+1,j3,1){\times}F_{dn3}(1,0,1)+\ldots+I(i3+1,j3,15){\times}F_{dn3}(1,0,15)+I(i3+1,j3+1,0){\times}F_{dn3}(1,1,0)+I(i3+1,j3+1,1){\times}F_{dn3}(1,1,1)+\ldots+I(i3+1,j3+1,15){\times}F_{dn3}(1,1,15)+I(i3+1,j3+2,0){\times}F_{dn3}(1,2,0)+I(i3+1,j3+2,1){\times}F_{dn3}(1,2,1)+\ldots+I(i3+1,j3+2,15){\times}F_{dn3}(1,2,15)+I(i3+2,j3,0){\times}F_{dn3}(2,0,0)+I(i3+2,j3,1){\times}F_{dn3}(2,0,1)+\ldots+I(i3+2,j3,15){\times}F_{dn3}(2,0,15)+I(i3+2,j3+1,0){\times}F_{dn3}(2,1,0)+I(i3+2,j3+1,1){\times}F_{dn3}(2,1,1)+\ldots+I(i3+2,j3+1,15){\times}F_{dn3}(2,1,15)+I(i3+2,j3+2,0){\times}F_{dn3}(2,2,0)+I(i3+2,j3+2,1){\times}F_{dn3}(2,2,1)+\ldots+I(i3+2,j3+2,15){\times}F_{dn3}(2,2,15) \quad (1).$$

Figure 6A:
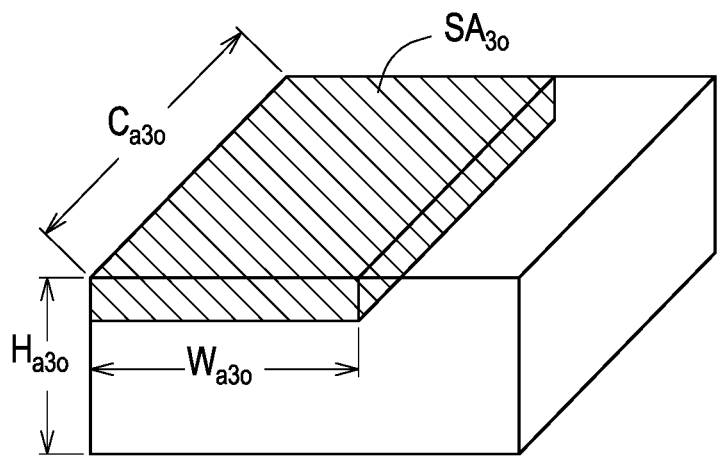
FIG. 6A to FIG. 6C are schematic diagrams of systolic array outputs according to an embodiment of the disclosure.

FIG. 6A is a schematic diagram of a systolic array output $SA_{3o}$ according to an embodiment of the disclosure. Referring to FIG. 6A, a height $H_{a3o}$ of the systolic array output $SA_{3o}$ is 1, a width $W_{a3o}$ thereof is 16, and a channel number $C_{a3o}$ thereof is 16. In Mathematical Expression (1), i3∈0 represents the height, j3∈0 to 15 represents the width, and n3∈0 to 15 represents a filter output channel.

Figure 6B:
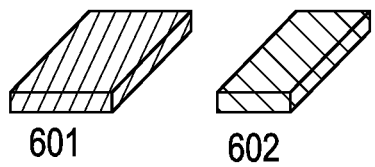

FIG. 6B is a schematic diagram of a systolic array output $SA_{4o}$ according to an embodiment of the disclosure. Referring to FIG. 6B, the height $H_{a3o}$ of the systolic array output $SA_{4o}$ is 1, a width $W_{a4o}$ thereof is 14, and the channel number $C_{a3o}$ thereof is 16. In Mathematical Expression (1), i3∈0 represents the height, j3∈16 to 29 represents the width, and n3∈0 to 15 represents the filter output channel. In addition, a completed output 601 is the systolic array output $SA_{3o}$ of FIG. 6A, and a currently processed output 602 is the systolic array output $SA_{4o}$.

Figure 6C:
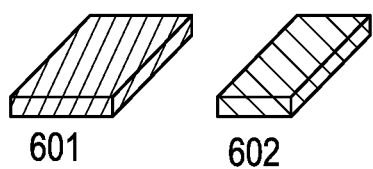
Figure 6C:
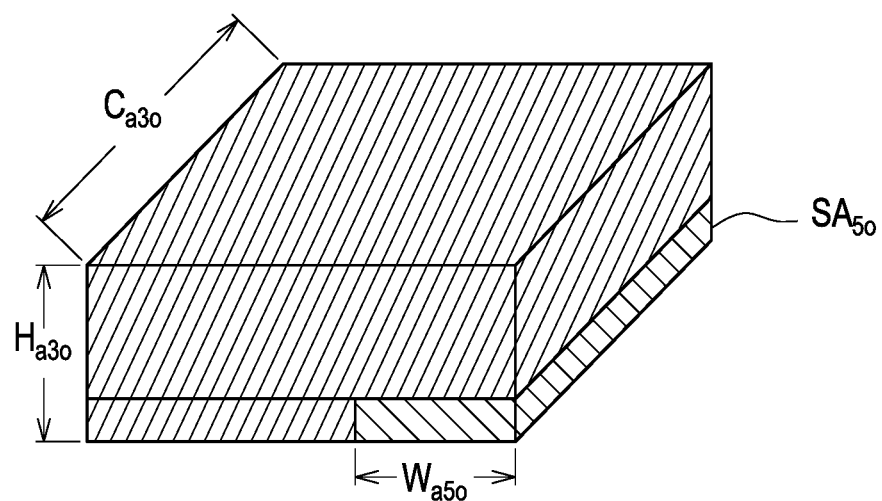

By analogy, FIG. 6C is a schematic diagram of a systolic array output $SA_{4o}$ according to an embodiment of the disclosure. Referring to FIG. 6C, the height $H_{a3o}$ of the systolic array output $SA_{5o}$ is 1, a width $W_{a5o}$ thereof is 14, and the channel number $C_{a3o}$ thereof is 16. In Mathematical Expression (1), i3∈4 represents the height, j3∈16 to 29 represents the width, and n3∈0 to 15 represents the filter output channel. In addition, the currently processed output 602 is the systolic array output $SA_{5o}$. The systolic array outputs $SA_{3o}$ to $SA_{5o}$ may form one or more first output data.

In an embodiment, the first computation is a convolution computation, and the first computing device 135 reads the first part data of the input data stored in the memory 110 toward a first sliding direction. The first computing device 135 divides the input data into multiple sections, and continues to read a next section in the first sliding direction parallel to the height of the input data, so as to serve as the first part data.

Figure 7A:
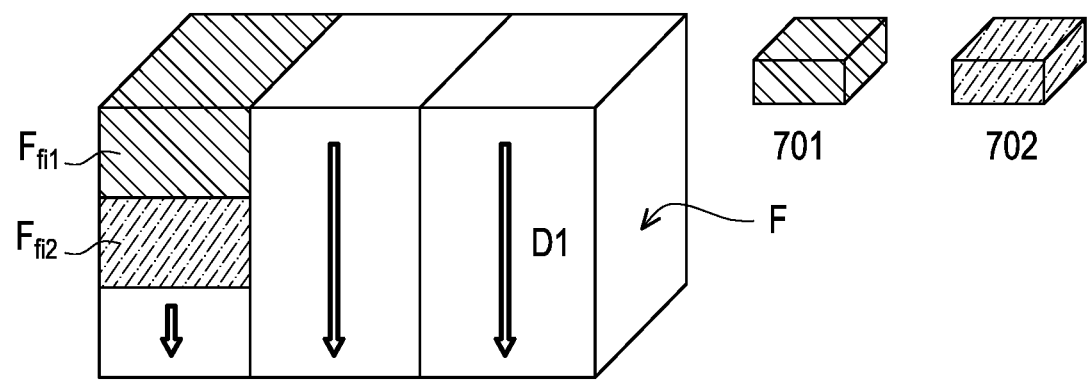
FIG. 7A is a schematic diagram of reading input data according to an embodiment of the disclosure.

For example, FIG. 7A is a schematic diagram of reading first part data $F_{fi1}$ and $F_{fi2}$ according to an embodiment of the disclosure. Referring to FIG. 7A, if the first computation of the first part data $F_{fi1}$ has been completed, the first computing device 135 will regard the first part data $F_{fi1}$ as a completed input 701, and further read the first part data $F_{fi2}$ of the next section of the input data F toward a direction D1 (for example, the bottom of the drawing) to serve as a currently processed input 702.

Figure 7B:
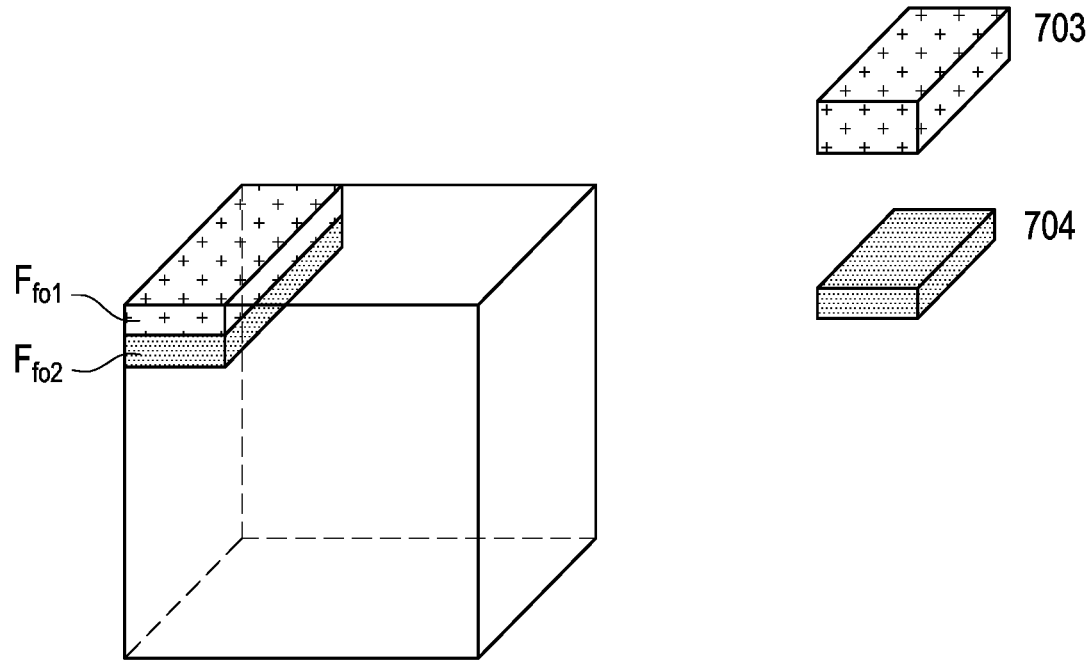
FIG. 7B is a schematic diagram of first output data according to an embodiment of the disclosure.

FIG. 7B is a schematic diagram of first output data $F_{fo1}$ and $F_{fo2}$ according to an embodiment of the disclosure. Referring to FIG. 7B, the first output data $F_{fo1}$ is the output of performing the convolution computation on the first part data $F_{fi1}$ of FIG. 7A and serves as a completed output 703. In addition, the first output data $F_{fo2}$ is the output of performing the convolution computation on the first part data $F_{fi2}$ of FIG. 7A and serves as a currently processed output 704. The first output data $F_{fo2}$ is also arranged at the bottom of the first output data $F_{fo1}$ according to the direction D1 of FIG. 7A.

Figure 7C:
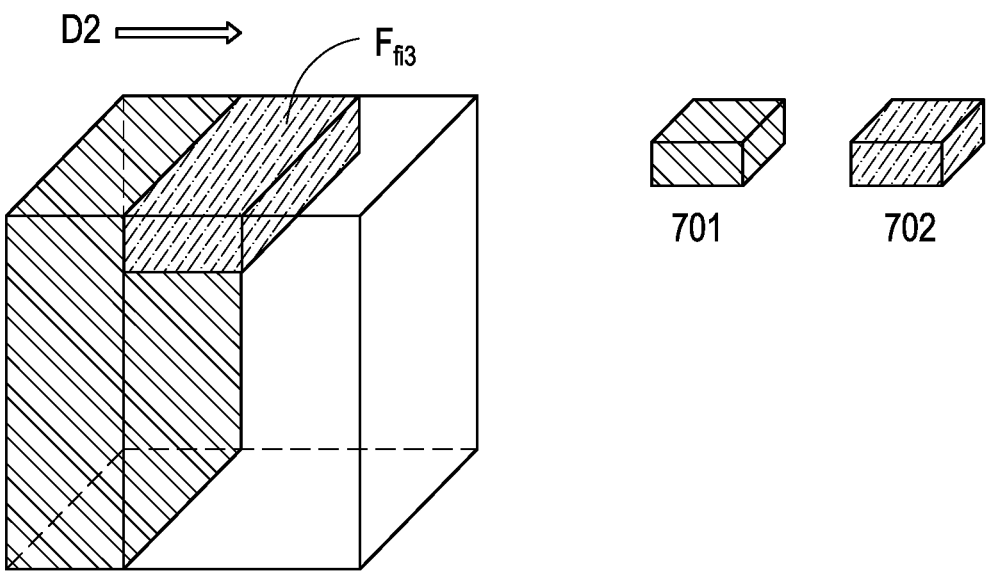
FIG. 7C is a schematic diagram of reading input data according to an embodiment of the disclosure.

FIG. 7C is a schematic diagram of reading input data $F_{fi3}$ according to an embodiment of the disclosure. Referring to FIG. 7C, if the completed input 701 has reached the bottom of the input data F, the first computing device 135 reads the first part data $F_{fi3}$ of the next section of the input data F toward a direction D2 (for example, the right side of the drawing) and from top to bottom (corresponding to the direction D1 of FIG. 7A) to serve as the currently processed input 702.

Figure 7D:
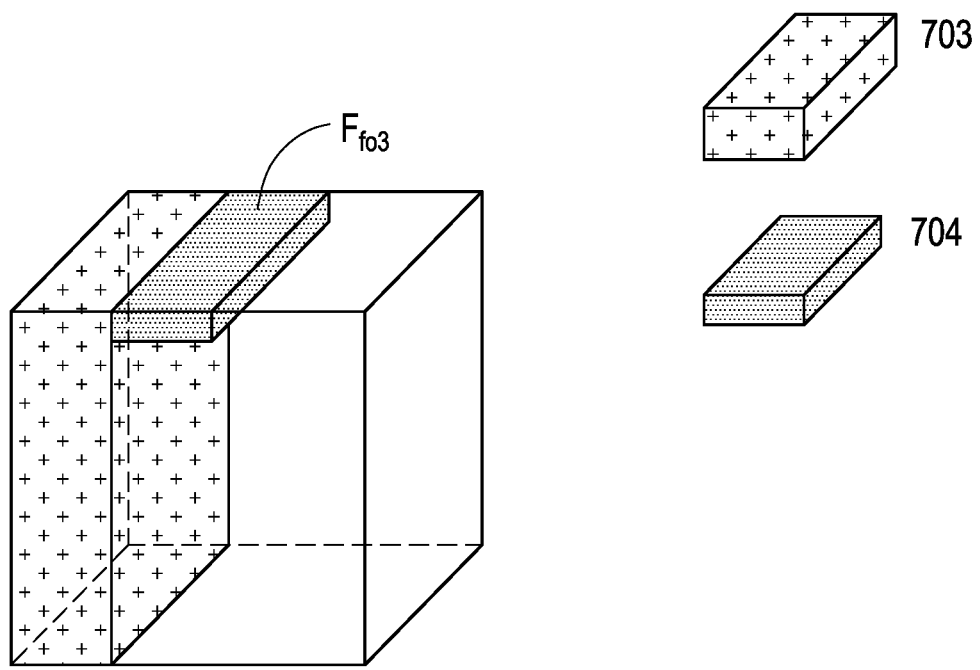
FIG. 7D is a schematic diagram of first output data according to an embodiment of the disclosure.

FIG. 7D is a schematic diagram of first output data $F_{fo3}$ according to an embodiment of the disclosure. Referring to FIG. 7D, the first output data $F_{fo3}$ is the output of performing the convolution computation on the first part data $F_{fi3}$ of FIG. 7C and serves as the currently processed output 704. Similarly, the currently processed output 704 is arranged at the right side of the completed output 703.

Figure 7E:
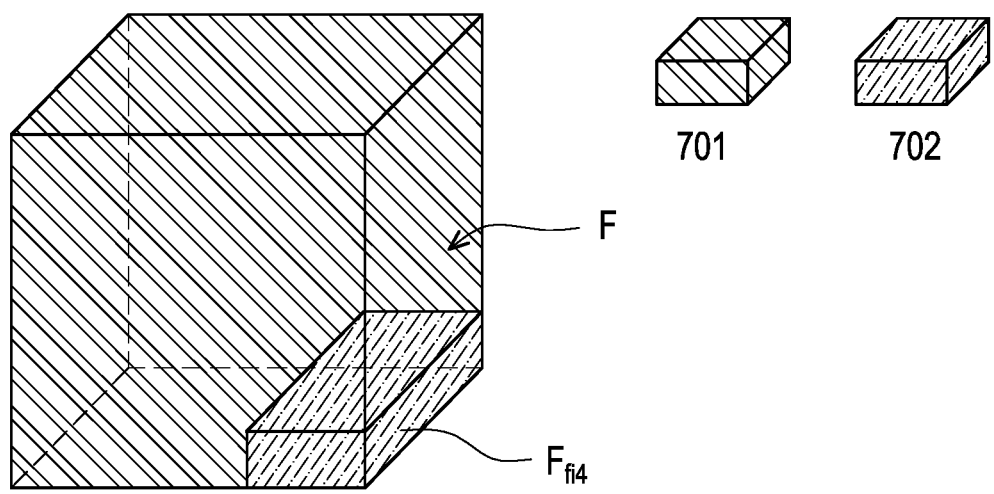
FIG. 7E is a schematic diagram of reading input data according to an embodiment of the disclosure.

FIG. 7E is a schematic diagram of reading input data $F_{fi4}$ according to an embodiment of the disclosure. Referring to FIG. 7E, the first part data $F_{fi4}$ of the currently processed input 702 is the last section of the input data.

Figure 7F:
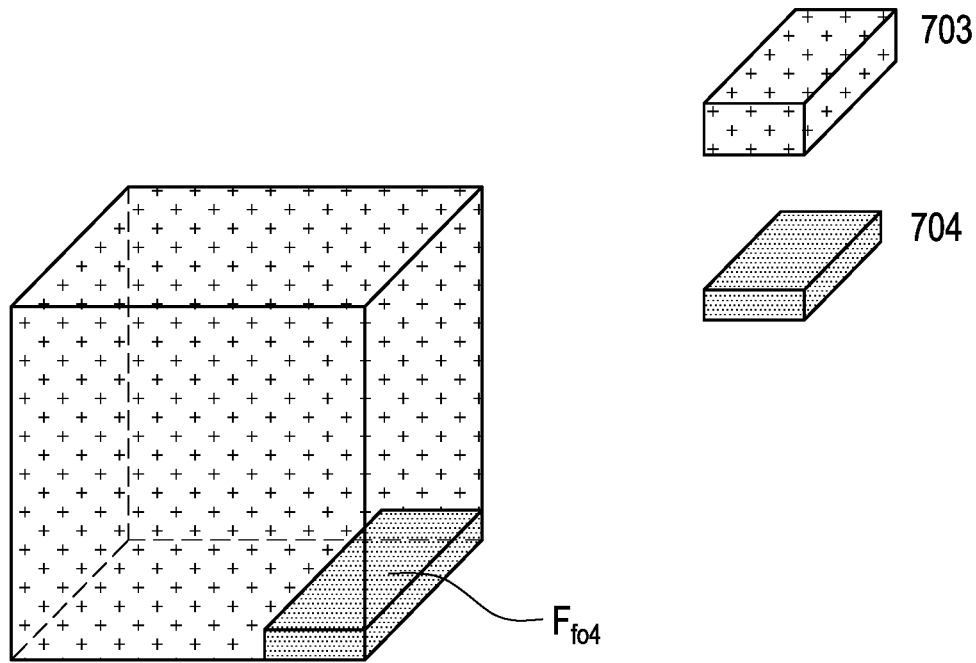
FIG. 7F is a schematic diagram of first output data according to an embodiment of the disclosure.

FIG. 7F is a schematic diagram of first output data $F_{fo4}$ according to an embodiment of the disclosure. Referring to FIG. 7F, the first output data $F_{fo4}$ is the output of performing the convolution computation on the first part data $F_{fi4}$ of FIG. 7E and serves as the currently processed output 704. Similarly, the currently processed output 704 is arranged at the bottom of the completed output 703, so as to complete the convolution computation of the input data F.

In another embodiment, the first computing device 135 reads the first part data of the input data stored in the memory 110 toward a second sliding direction (different from the first sliding direction). Similarly, the first computing device 135 divides the input data into multiple sections, and continues to read the next section in the second sliding direction parallel to the width of the input data, so as to serve as the first part data.

Figure 8:
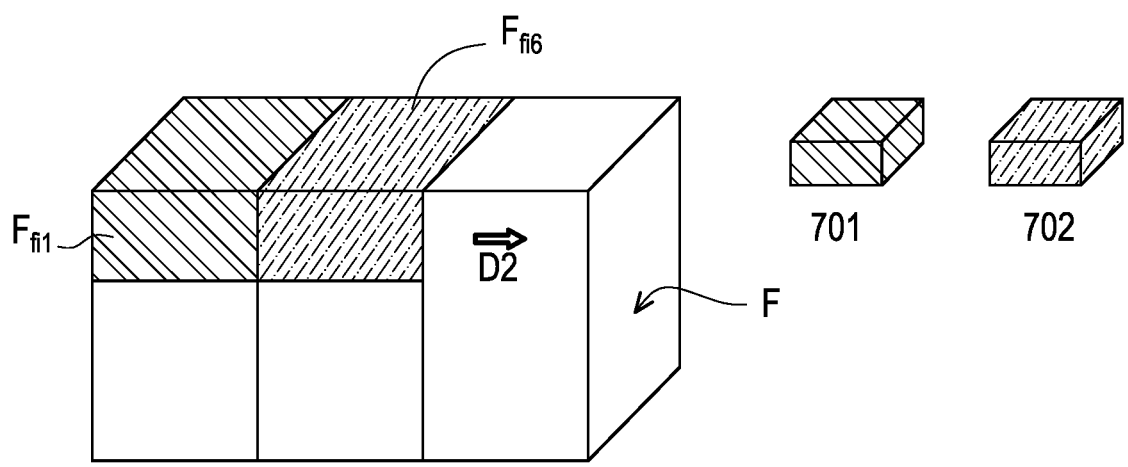
FIG. 8 is a schematic diagram of reading input data according to an embodiment of the disclosure.

For example, FIG. 8 is a schematic diagram of reading input data according to an embodiment of the disclosure. Referring to FIG. 8, if the first computation of the first part data $F_{fi1}$ has been completed, the first computing device 135 will regard the first part data $F_{fi1}$ as the completed input 701, and further read first part data $F_{fi6}$ of the next section of the input data F toward the direction D2 (for example, the right side of the drawing) to serve as the currently processed input 702. Similarly, if the last section of the same row has been read toward the direction D2, the first computing device 135 will read the section at the bottom of the first part data $F_{fi1}$. In addition, for the arrangement of the first part data $F_{fi1}$ and other first part data (not shown), reference may be made to the above description and will not be repeated here.

Referring to FIG. 2, the first computing device 135 buffers one or more first output data to the first buffer of the first buffer memory 151 (Step S250). Specifically, different from the prior art that outputs the first output data to the memory 110, the first output data of the embodiment of the disclosure outputs the first output data to the first buffer memory 151 of the second computing device 155, thereby reducing the number of accesses of the memory 110.

When the first output data buffered in the first buffer memory 151 (or the first buffer) is greater than the first predetermined data amount, the second computing device 155 performs the second computation on the first output data to obtain the second output data (Step S270). Specifically, in the existing multi-convolutional layer architecture, a next convolutional layer needs to wait until a previous convolutional layer computes all input data thereof and outputs the input data to a main memory before reading the input data output by the previous convolutional layer from the main memory. Different from the prior art, in addition to buffering to a storage medium (for example, the first buffer memory 151 or the second buffer memory 171) other than the memory 110, the embodiment of the disclosure may further trigger the convolution computation of the next convolutional layer whenever the size (that is, the first predetermined data amount) of the input data required by the next convolutional layer is satisfied. At the same time, if the computation of all the input data by the previous convolutional layer has not been completed, the computations of the two convolutional layers may be performed at the same time. In other words, when the second computing device 155 performs the second computation on the first output data, the first computing device 135 continuously performs the first computation on the input data.

It is worth noting that second part data input by the second computation includes the first output data buffered in the first buffer memory 151, and the size of the second output data is related to the size of the second filter of the second computation. It is assumed that the second computation is a depthwise convolution computation. Each filter of the depthwise convolution computation only corresponds to data of one channel in the second part data. That is, any filter of the depthwise convolution computation only performs the convolution computation on the data of one channel. Therefore, the number of filters of the depthwise convolution computation is usually equal to a channel number of the second part data. However, each filter of the convolution computation performs the convolution computation on the data of all channels. In addition, as long as the height of the buffered first output data increases to the height of the filter and the width of the first output data increases to the width of the filter, the filter may perform the depthwise convolution computation on the buffered first output data (to serve as the second part data).

In an embodiment, it is assumed that the height of each filter used in the depthwise convolution computation is $H_{kd}$, and the width of the filter is $W_{kd}$. The height of the first output data of each section is $H_{flo}$, and the width of the first output data is $W_{flo}$. When the first output data buffered in the first buffer memory 151 or the first buffer is greater than $W_{kd} \times H_{kd}$, the second computing device 155 may perform the second computation. When the first output data buffered in the first buffer memory 151 or the first buffer is greater than the first predetermined data amount, the height formed by the first output data buffered in the first buffer memory 151 or the first buffer is $M_H \times H_{flo}$ and the width formed is $M_W \times W_{flo}$. $M_H$ and $M_W$ are multiples and positive integers, $M_H \times H_{flo}$ is not less than $H_{kd}$, and $M_W \times W_{flo}$ is not less than $W_{kd}$. In other words, when the height $M_H \times H_{flo}$ of the buffered first output data is less than the height $H_{kd}$ of the filter and the width $M_W \times W_{flo}$ of the buffered first output data is less than the width $W_{kd}$ of the filter, the second computing device 155 will continue to wait for a next first output data or systolic array output until the height $M_H \times H_{flo}$ of the buffered first output data is greater than or equal to the height $H_{kd}$ of the filter and the width $M_W \times W_{flo}$ of the buffered first output data is greater than or equal to the width $W_{kd}$ of the filter.

Figure 9A:
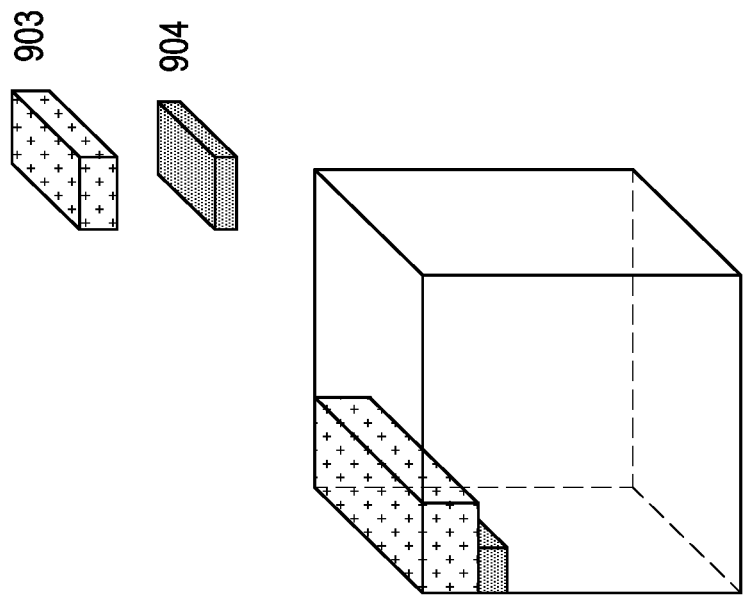
FIG. 9A is a schematic diagram of a trigger condition of a second computation according to an embodiment of the disclosure.
Figure 9A:
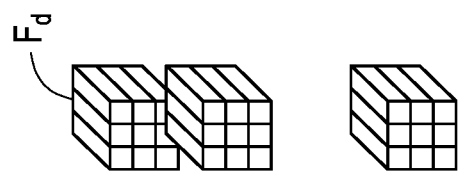
Figure 9A:
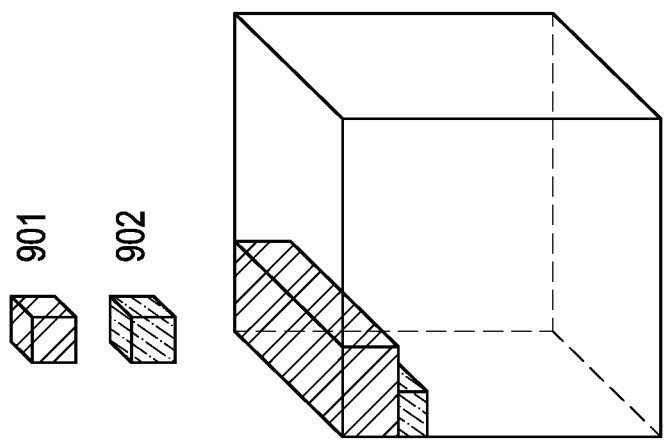
Figure 9B:
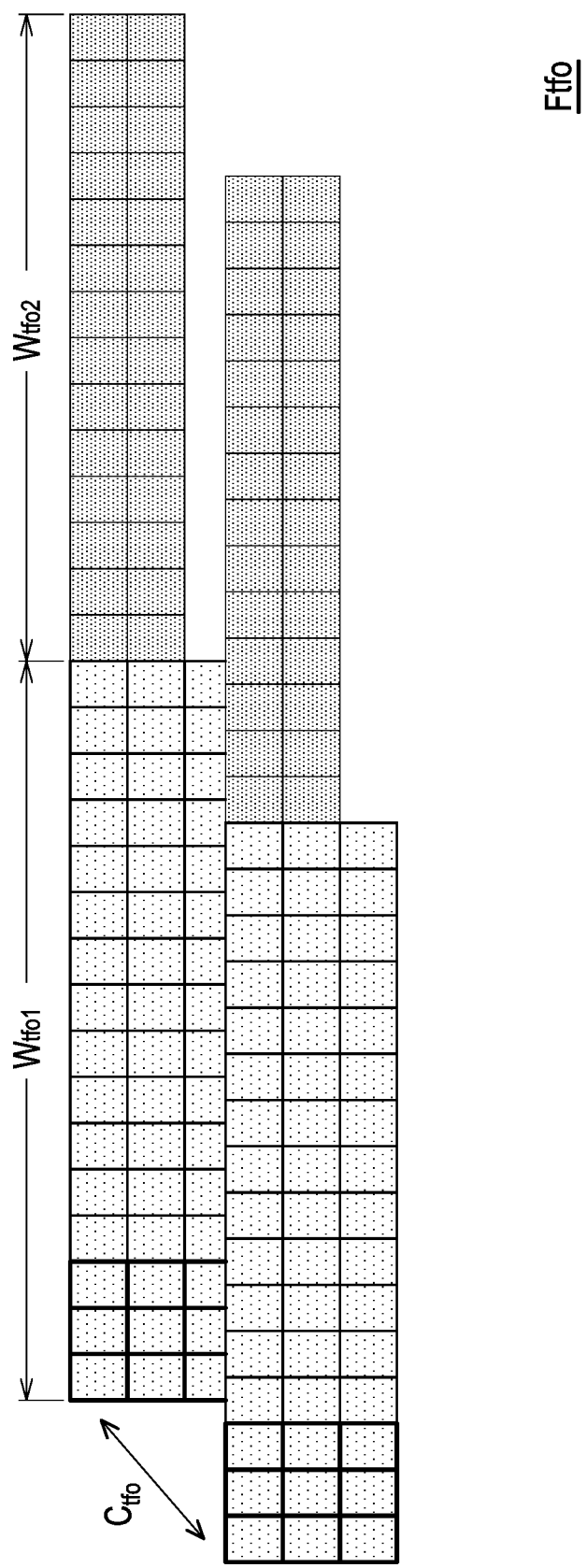
FIG. 9B is a schematic diagram of buffered first output data according to an embodiment of the disclosure.

For example, FIG. 9A is a schematic diagram of a trigger condition of a second computation according to an embodiment of the disclosure, and FIG. 9B is a schematic diagram of buffered first output data according to an embodiment of the disclosure. Referring to FIG. 9A, a completed input 901 of the input data corresponds to a completed output 903 of the first output data. If the sizes of a currently processed output 904 corresponding to a currently processed input 902 and the completed output 903 meet the size required by the second computation, the second computation may be triggered.

Referring to FIG. 9B, it is assumed that the completed output 903 and the currently processed output 904 of FIG.

9A form buffered first output data $F_{tfo}$. The size of the systolic array used by the first computing device 135 is 16×16, where a width $W_{tfo1}$ of the systolic array output may be 16 or a width $W_{tfo2}$ may be 14. It is assumed that the height of each filter used in the depthwise convolution computation is 3, and the width of the filter is 3. The widths $W_{tfo1}$ and $W_{tfo2}$ are both greater than 3. If a fifth systolic array output is buffered in the first buffer memory 151, the size (height, width, channel number) of the first to fifth systolic array output is (1, 16, 16) or (1, 14, 16), that is, the size formed by the output with a channel number $C_{tfo}$ of 16 has satisfied the size of 3×3. That is, the systolic array output with a height of 1 is stacked into three layers, so that the height after stacking is 3. At this time, the systolic array outputs may be used as the second part data and may be used for the second computation.

It should be noted that in FIG. 9A and FIG. 9B, as long as the number of stacked layers is equal to the height of the filter, the second computation is triggered. However, in other embodiments, the number of stacked layers may be greater than the height of the filter.

Figure 10A:
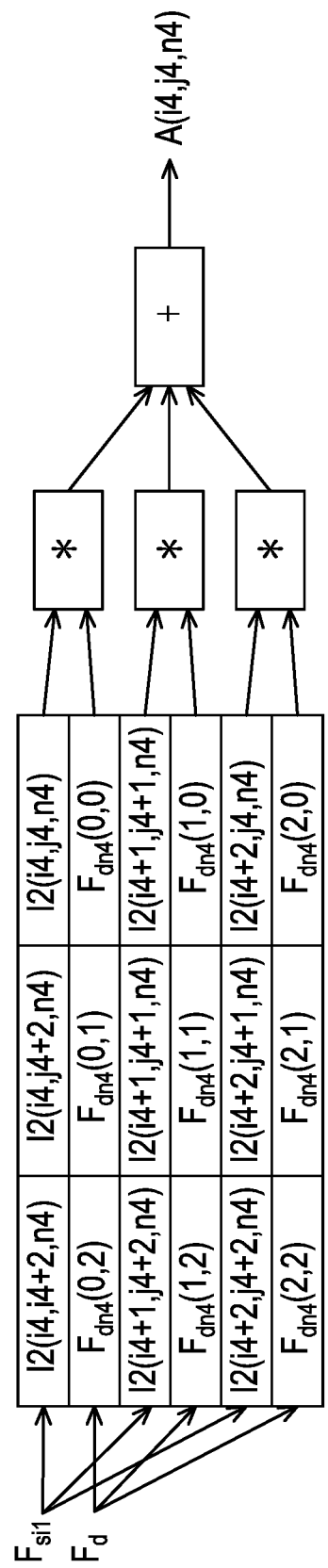
FIG. 10A is a schematic diagram of a second computation according to an embodiment of the disclosure.

For the depthwise convolution computation, FIG. 10A is a schematic diagram of a second computation according to an embodiment of the disclosure. Referring to FIG. 10A, it is assumed that the size (height, width, channel number) of second part data $F_{si1}$ is (5, 30, 16), and the size of a filter $F_d$ used in the depthwise convolution computation is 3×3. $I(i4,j4,n4)$ represents values of the second part data at a position (height position i4, width position j4, channel position n4). $F_{dn4}(i5,j5,n5)$ represents values of an n4-th filter read at a position (height position i5, width position j5). $A(i4,j4,n4)$ represents values of the second output data or the systolic array output at a position defined as (height position i4, width position j4, channel position n4), and the mathematical expression thereof is:

$$A(i4,j4,n4)=I(i4,j4,n4) \times F_{dn4}(0,0)+I(i4,j4+1,n4) \times F_{dn4}(0,1)+I(i4,j4+2,n4) \times F_{dn4}(0,2)+I(i4+1,j4,n4) \times F_{dn4}(1,0)+I(i4+1,j4+1,n4) \times F_{dn4}(1,1)+I(i4+1,j4+2,n4) \times F_{dn4}(1,2)+I(i4+2,j4,n) \times F_{dn4}(2,0)+I(i4+2,j4+1,n4) \times F_{dn4}(2,1)+I(i4+2,j4+2,n4) \times F_{dn4}(2,2) \quad (2).$$

Figure 10B:
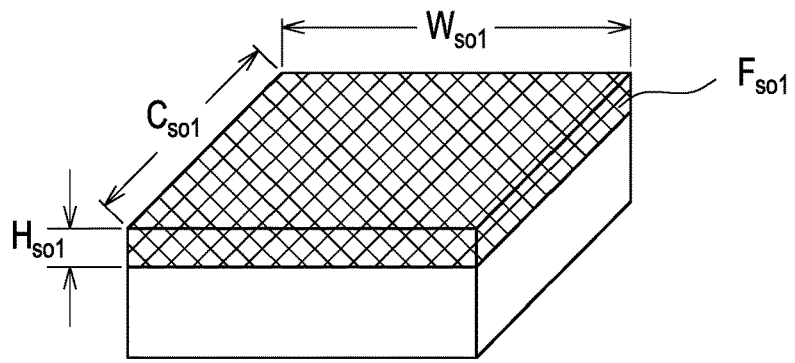
FIG. 10B to FIG. 10D are schematic diagrams of second output data according to an embodiment of the disclosure.

FIG. 10B is a schematic diagram of second output data $F_{so1}$ according to an embodiment of the disclosure. Referring to FIG. 10B, it is assumed that the size (configured with height $H_{so1}$, width $W_{so1}$, and channel number $C_{so1}$) of the currently processed second output data $F_{so1}$ is (1,28, 16). Each value in the second output data $F_{so1}$ is:

$$A(0,0,n4)=I(0,0,n4) \times F_{dn4}(0,0)+I(0,1,n4) \times F_{dn4}(0,1)+I(0,2,n4) \times F_{dn4}(0,2)+I(1,0,n4) \times F_{dn4}(1,0)+I(1,1,n4) \times F_{dn4}(1,1)+I(1,2,n4) \times F_{dn4}(1,2)+I(2,0,n) \times F_{dn4}(2,0)+I(2,1,n4) \times F_{dn4}(2,1)+I(2,2,n4) \times F_{dn4}(2,2) \quad (3)$$

$$A(0,1,n4)=I(0,1,n4) \times F_{dn4}(0,0)+I(0,2,n4) \times F_{dn4}(0,1)+I(0,3,n4) \times F_{dn4}(0,2)+I(1,1,n4) \times F_{dn4}(1,0)+I(1,2,n4) \times F_{dn4}(1,1)+I(1,3,n4) \times F_{dn4}(1,2)+I(2,1,n) \times F_{dn4}(2,0)+I(2,2,n4) \times F_{dn4}(2,1)+I(2,3,n4) \times F_{dn4}(2,2) \quad (4)$$

$$A(0,27,n4)=I(0,27,n4) \times F_{dn4}(0,0)+I(0,28,n4) \times F_{dn4}(0,1)+I(0,29,n4) \times F_{dn4}(0,2)+I(1,27,n4) \times F_{dn4}(1,0)+I(1,28,n4) \times F_{dn4}(1,1)+I(1,29,n4) \times F_{dn4}(1,2)+I(2,27,n) \times F_{dn4}(2,0)+I(2,28,n4) \times F_{dn4}(2,1)+I(2,29,n4) \times F_{dn4}(2,2) \quad (5)$$

and the rest may be deduced by analogy, so there will be no repetition.

Figure 10C:
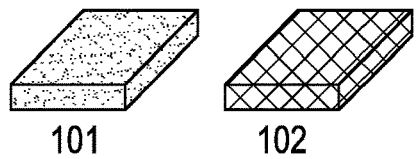
Figure 10C:
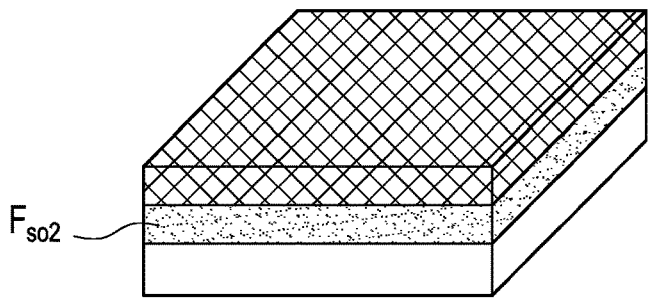

FIG. 10C is a schematic diagram of second output data $F_{so2}$ according to an embodiment of the disclosure. Referring to FIG. 10C, a completed output 101 is the second output data $F_{so1}$ of FIG. 10B. The second output data $F_{so2}$ is a currently processed output 102, and the size thereof may be the same as the second output data $F_{so1}$ of FIG. 10B. Each value in the second output data $F_{so2}$ is:

$$A(1,0,n4)=I(1,0,n4) \times F_{dn4}(0,0)+I(1,1,n4) \times F_{dn4}(0,1)+I(1,2,n4) \times F_{dn4}(0,2)++I(2,0,n4) \times F_{dn4}(1,0)+I(2,1,n4) \times F_{dn4}(1,1)+I(2,2,n4) \times F_{dn4}(1,2)+I(3,0,n) \times F_{dn4}(2,0)+I(3,1,n4) \times F_{dn4}(2,1)+I(3,2,n4) \times F_{dn4}(2,2) \quad (6)$$

$$A(1,1,n4)=I(1,1,n4) \times F_{dn4}(0,0)+I(1,2,n4) \times F_{dn4}(0,1)+I(1,3,n4) \times F_{dn4}(0,2)+I(2,1,n4) \times F_{dn4}(1,0)+I(2,2,n4) \times F_{dn4}(1,1)+I(2,3,n4) \times F_{dn4}(1,2)+I(3,1,n) \times F_{dn4}(2,0)+I(3,2,n4) \times F_{dn4}(2,1)+I(3,3,n4) \times F_{dn4}(2,2) \quad (7)$$

$$A(1,27,n4)=I(1,27,n4) \times F_{dn4}(0,0)+I(1,28,n4) \times F_{dn4}(0,1)+I(1,29,n4) \times F_{dn4}(0,2)+I(2,27,n4) \times F_{dn4}(1,0)+I(2,28,n4) \times F_{dn4}(1,1)+I(2,29,n4) \times F_{dn4}(1,2)+I(3,27,n) \times F_{dn4}(2,0)+I(3,28,n4) \times F_{dn4}(2,1)+I(3,29,n4) \times F_{dn4}(2,2) \quad (8)$$

and the rest may be deduced by analogy, so there will be no repetition.

Figure 10D:
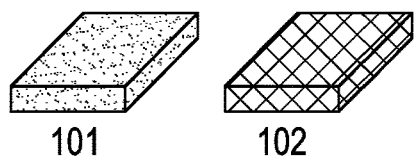
Figure 10D:
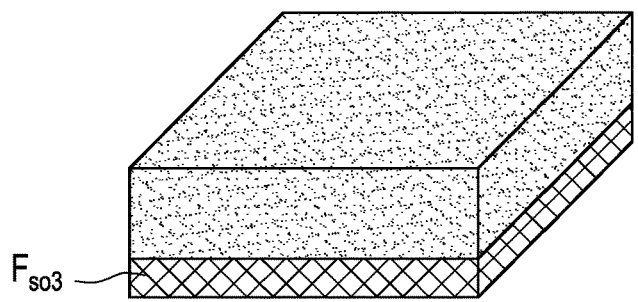

FIG. 10D is a schematic diagram of second output data $F_{so3}$ according to an embodiment of the disclosure. Referring to FIG. 10D, the second output data $F_{so3}$ is a currently processed output 102, and the size thereof may be the same as the second output data $F_{so1}$ of FIG. 10B. Each value in the second output data $F_{so3}$ is:

$$A(2,0,n4)=I(2,0,n4) \times F_{dn4}(0,0)+I(2,1,n4) \times F_{dn4}(0,1)+I(2,2,n4) \times F_{dn4}(0,2)+I(3,0,n4) \times F_{dn4}(1,0)+I(3,1,n4) \times F_{dn4}(1,1)+I(3,2,n4) \times F_{dn4}(1,2)+I(4,0,n) \times F_{dn4}(2,0)+I(4,1,n4) \times F_{dn4}(2,1)+I(4,2,n4) \times F_{dn4}(2,2) \quad (9)$$

$$A(2,1,n4)=I(2,1,n4) \times F_{dn4}(0,0)+I(2,2,n4) \times F_{dn4}(0,1)+I(2,3,n4) \times F_{dn4}(0,2)+I(3,1,n4) \times F_{dn4}(1,0)+I(3,2,n4) \times F_{dn4}(1,1)+I(3,3,n4) \times F_{dn4}(1,2)+I(4,1,n) \times F_{dn4}(2,0)+I(4,2,n4) \times F_{dn4}(2,1)+I(4,3,n4) \times F_{dn4}(2,2) \quad (10)$$

$$A(2,27,n4)=I(2,27,n4) \times F_{dn4}(0,0)+I(2,28,n4) \times F_{dn4}(0,1)+I(2,29,n4) \times F_{dn4}(0,2)+I(3,27,n4) \times F_{dn4}(1,0)+I(3,28,n4) \times F_{dn4}(1,1)+I(3,29,n4) \times F_{dn4}(1,2)+I(4,27,n) \times F_{dn4}(2,0)+I(4,28,n4) \times F_{dn4}(2,1)+I(4,29,n4) \times F_{dn4}(2,2) \quad (11)$$

and the rest may be deduced by analogy, so there will be no repetition.

In an embodiment, the second computing device 155 adopts a systolic array structure. The second computing device 155 divides the second part data (that is, a part of the buffered first output data) into multiple second systolic array inputs, and respectively performs the second computation on the second systolic array inputs to obtain multiple second systolic array outputs. The size of each second systolic array output is limited by the size of the systolic array. For example, an element number of the second systolic array output is less than or equal to the capacity of the systolic array. In addition, the second systolic array outputs based on the same second part data form the second output data. Taking FIG. 10B as an example, if the size of the systolic array is 16×16, the second output data $F_{so1}$ includes 1×16× 16 and 1×12×16 second systolic array outputs.

Figure 11:
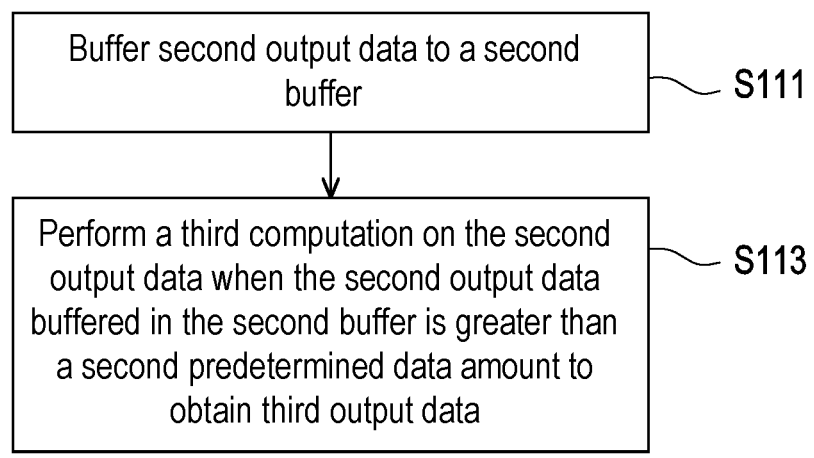
FIG. 11 is a flowchart of a data processing method based on a convolutional neural network according to an embodiment of the disclosure.

For the next convolutional layer, FIG. 11 is a flowchart of a data processing method based on a convolutional neural network according to an embodiment of the disclosure. Referring to FIG. 11, in an embodiment, the second computing device 155 may buffer one or more second output data in a second buffer of the second buffer memory 171 (Step S111) (Step S280). Specifically, similarly, in the embodiment of the disclosure, the output of the previous convolutional layer is buffered in the buffer of the next convolutional layer, instead of directly outputting the output data to the memory 110.

When the second output data buffered in the second buffer memory 171 or the second buffer is greater than a second predetermined data amount, the third computing device 175 may perform the third computation on the second output data to obtain third output data (Step S113). Specifically, third part data input by the third computation includes the second output data buffered in the second buffer memory 171, and the size of the third part data is related to the size of the filter of the third computation. It is assumed that the third computation is the pointwise convolution computation. The size of each filter of the pointwise convolution computation is only 1×1. Similar to the convolution computation, each filter of the pointwise convolution computation also performs the convolution computation on the data of all channels. In addition, as long as the height of the buffered second output data increases to the height (which is 1) of the filter and the width of the second output data increases to the width (which is 1) of the filter, the filter may perform the pointwise convolution computation on the buffered second output data (to serve as the third part data).

In an embodiment, as shown in FIG. 10B to FIG. 10D, each second output data may satisfy the size required by the pointwise convolution computation. Therefore, the second FIFO unit 172 may sequentially input each second output data to the third computing device 175. The third computing device 175 may perform the third computation on each buffered second output data.

Figure 12A:
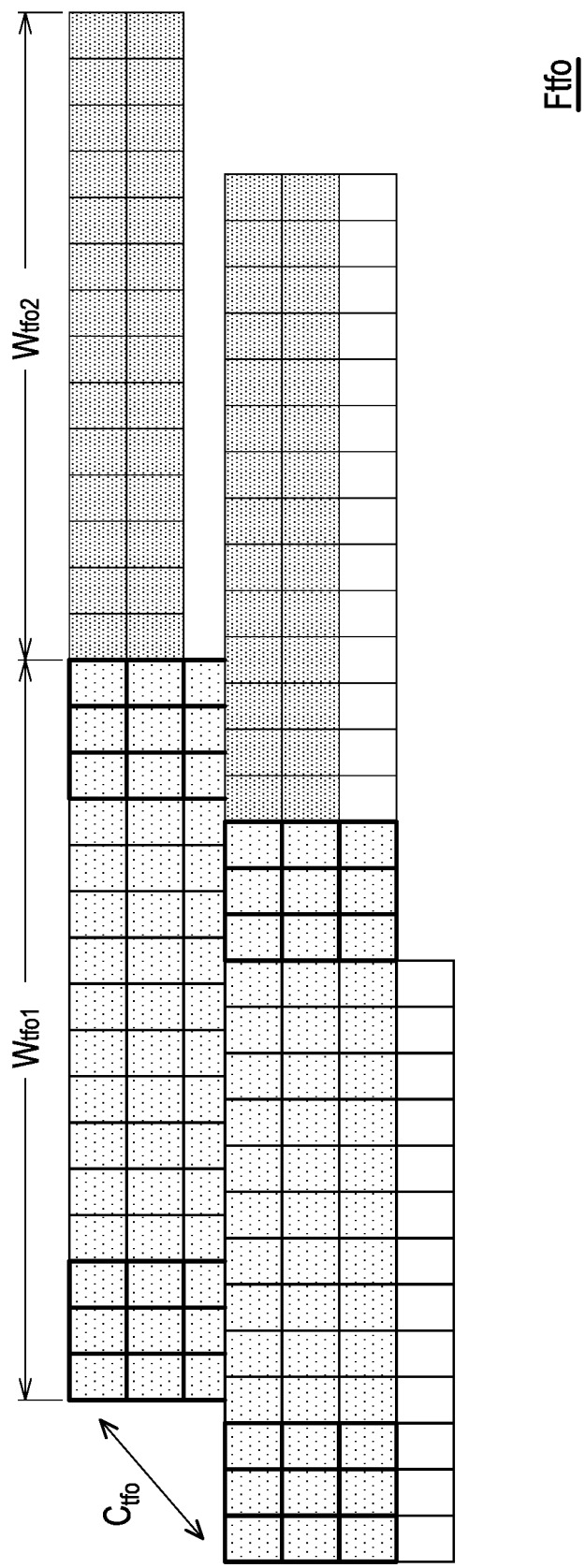
FIG. 12A is a schematic diagram of buffered first output data according to an embodiment of the disclosure.
Figure 12B:
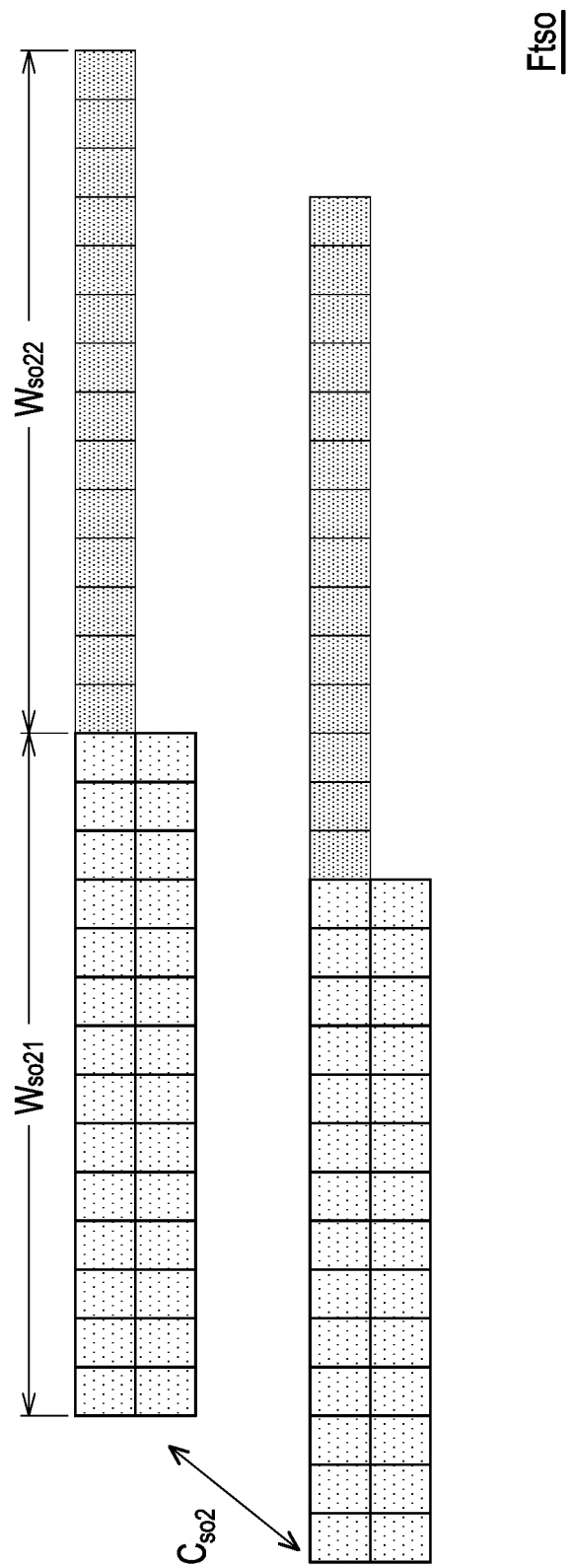
FIG. 12B is a schematic diagram of buffered second output data according to an embodiment of the disclosure.

For example, FIG. 12A is a schematic diagram of buffered first output data $F_{tfo}$ according to an embodiment of the disclosure, and FIG. 12B is a schematic diagram of buffered second output data $F_{tso}$ according to an embodiment of the disclosure. Referring to FIG. 12A and FIG. 12B, if the second computing device 155 has completed the convolution computation on a part of the buffered first output data, the first buffer memory 151 may buffer the second systolic array output with the size (height, width, channel number) configured as $(1, W_{so21}, C_{so2})$ or the second output data with the size configured as $(1, W_{so21}+W_{so21}, C_{so2})$, so as to become the buffered second output data $F_{tso}$. The channel number $C_{so2}$ is the same as a channel number C.

Figure 13A:
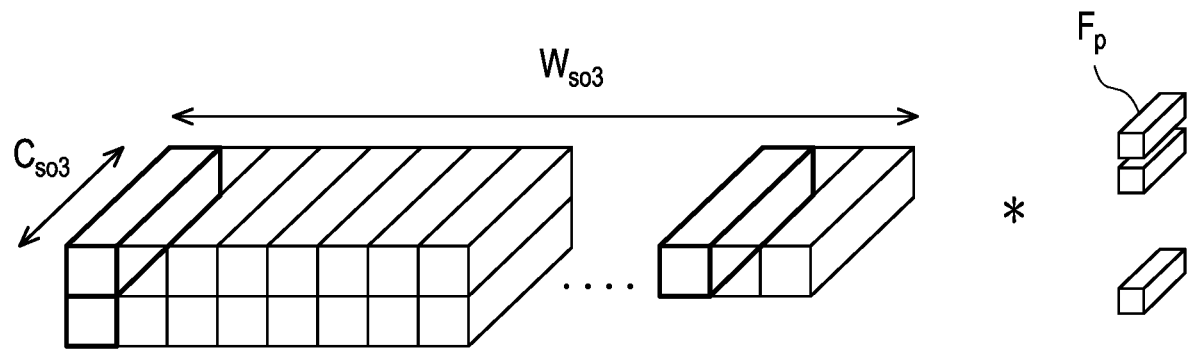
FIG. 13A is a schematic diagram of a third computation according to an embodiment of the disclosure.

FIG. 13A is a schematic diagram of a third computation according to an embodiment of the disclosure. Referring to FIG. 13A, the third computing device 175 uses the buffered second output data $F_{tso}$ of FIG. 12B as third part data $F_{ti}$ (with a width $W_{so3}$ thereof being $W_{so21}+W_{so21}$), and performs the third computation on the third part data $F_{ti}$ and a filter $F_p$ used by the pointwise convolution computation.

Figure 13B:
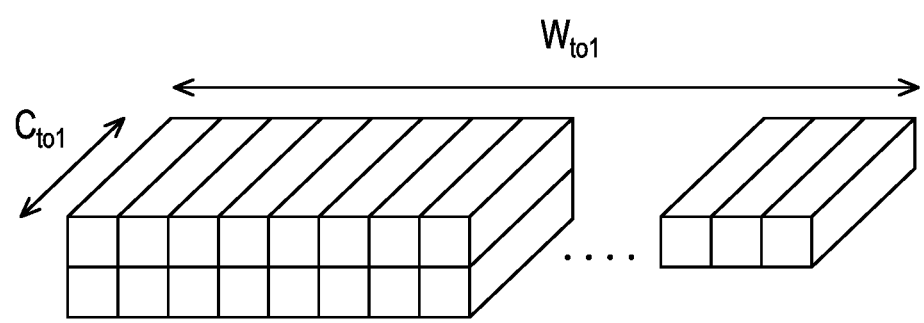
FIG. 13B is a schematic diagram of third output data according to an embodiment of the disclosure.

FIG. 13B is a schematic diagram of third output data $F_{to}$ according to an embodiment of the disclosure. Referring to FIG. 13A and FIG. 13B, the size of the third output data $F_{to}$ is equal to the third part data $F_{ti}$. That is, a width $W_{to1}$ is the same as the width $W_{so3}$, and a channel number $C_{to1}$ is the same as the channel number $C_{so2}$.

In an embodiment, the third computing device 175 adopts a systolic array structure. The third computing device 175 divides the third part data into multiple third systolic array inputs, and respectively performs the third computation on the third systolic array inputs to obtain multiple third systolic array outputs. The size of each third systolic array output is limited by the size of the systolic array. For example, an element number output by the third systolic array is less than or equal to the capacity of the systolic array. In addition, the third systolic array outputs based on the same third part data (that is, a part of the buffered second output data) form the third output data. For example, if the size of the third part data is 1×28×16 and the size of the systolic array is 16×16, the third output data includes 1×16×16 and 1×12×16 third systolic array outputs.

Figure 14A:
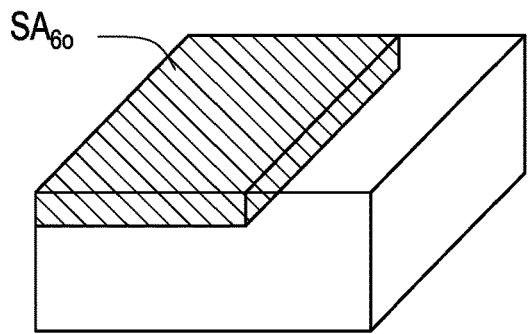
FIG. 14A to FIG. 14C are schematic diagrams of systolic array outputs according to an embodiment of the disclosure.

For example, FIG. 14A is a schematic diagram of a systolic array output $SA_{6o}$ according to an embodiment of the disclosure. Referring to FIG. 14A, table (6) is the data of the second output data stored in the second buffer memory 171:

TABLE 6

| I(0, 0, 15) | I(0, 0, 14) | ... | I(0, 0, 1) | I(0, 0, 0) |
| I(0, 1, 15) | I(0, 1, 14) | ... | I(0, 1, 1) | I(0, 1, 0) |
| ... | ... | ... | ... | ... |
| I(0, 15, 15) | I(0, 15, 14) | ... | I(0, 15, 1) | I(0, 15, 0) |

I(i6,j6,n6) represents values of the input data read at a position (height position i6, width position j6, channel position n6). The second FIFO unit 172 sequentially inputs the data to the third computing device 175 from right to left and from top to bottom.

Table (7) is data of a 1×1 filter with 16 channels used in the pointwise convolution computation:

TABLE 7

| Channel 0 | Channel 1 | ... | Channel 14 | Channel 15 |
| --- | --- | --- | --- | --- |
| $F_{p0}(0, 0, 15)$ | $F_{p1}(0, 0, 15)$ | ... | $F_{p14}(0, 0, 15)$ | $F_{p15}(0, 0, 15)$ |
| ... | ... | ... | ... | ... |
| $F_{p0}(0, 0, 1)$ | $F_{p1}(0, 0, 1)$ | ... | $F_{p14}(0, 0, 1)$ | $F_{p15}(0, 0, 1)$ |
| $F_{p0}(0, 0, 0)$ | $F_{p1}(0, 0, 0)$ | ... | $F_{p14}(0, 0, 0)$ | $F_{p15}(0, 0, 0)$ |

$F_{dn}(i7,j7,n7)$ represents values of the n-th filter read at a position defined as (height position i7, width position j7, channel position n7).

Table (8) shows the systolic array output:

TABLE 8

| A(0, 0, 0) | A(0, 0, 1) | ... | A(0, 0, 14) | A(0, 0, 15) |
| A(0, 1, 0) | A(0, 1, 1) | ... | A(0, 1, 14) | A(0, 1, 15) |
| ... | ... | ... | ... | ... |
| A(0, 15, 0) | A(0, 15, 1) | ... | A(0, 15, 14) | A(0, 15, 15) |

A(i6,j6,n6) represents values of the systolic array output at a position defined as (height position i6, width position j6, channel position n6), and the mathematical expression thereof is:

$$A(i6,j3,n6)=I(i6,j6,0)\times F_{dn6}(0,0,0)+I(i6,j6,1)\times F_{dn6}(0,0,1)+\ldots+I(i6,j6,15)\times F_{dn6}(0,0,15) \quad (12).$$

Therefore, each value of the systolic array output $SA_{6o}$ is (n6∈0 to 15):

$$A(0,0,n6)=I(0,0,0)\times F_{dn6}(0,0,0)+I(0,0,1)\times F_{dn6}(0,0,1)+\ldots+I(0,0,15)\times F_{dn6}(0,0,15) \quad (13);$$

$$A(0,1,n6)=I(0,1,0)\times F_{dn6}(0,0,0)+I(0,1,1)\times F_{dn6}(0,0,1)+\ldots+I(0,1,15)\times F_{dn6}(0,0,15) \quad (14).$$

$$A(0,15,n6)=I(0,15,0)\times F_{dn6}(0,0,0)+I(0,15,1)\times F_{dn6}(0,0,1)+\ldots+I(0,15,15)\times F_{dn6}(0,0,15) \quad (15),$$

and the rest may be deduced by analogy, so there will be no repetition.

Figure 14B:
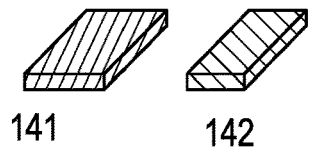
Figure 14B:
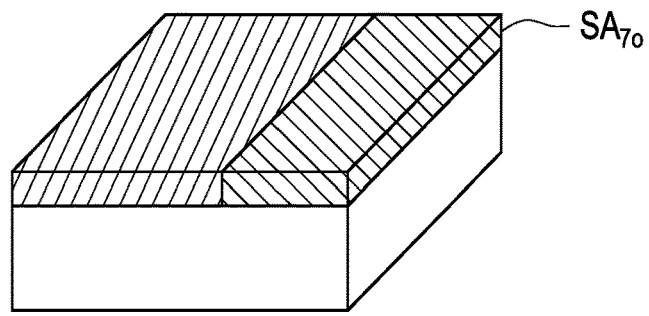

For another example, FIG. 14B is a schematic diagram of a systolic array output $SA_{7o}$ according to an embodiment of the disclosure. Referring to FIG. 14A, table (9) is data of the second output data stored in the second buffer memory 171:

TABLE 9

| I(0, 16, 15) | I(0, 16, 14) | ... | I(0, 16, 1) | I(0, 17, 0) |
|---|---|---|---|---|
| I(0, 17, 15) | I(0, 17, 14) | ... | I(0, 17, 1) | I(0, 17, 0) |
| ... | ... | ... | ... | ... |
| I(0, 27, 15) | I(0, 27, 14) | ... | I(0, 27, 1) | I(0, 27, 0) |

Table (10) shows the systolic array output:

TABLE 10

| A(0, 16, 0) | A(0, 16, 1) | ... | A(0, 16, 14) | A(0, 16, 15) |
|---|---|---|---|---|
| A(0, 17, 0) | A(0, 17, 1) | ... | A(0, 17, 14) | A(0, 17, 15) |
| ... | ... | ... | ... | ... |
| A(0, 27, 0) | A(0, 27, 1) | ... | A(0, 27, 14) | A(0, 27, 15) |

Therefore, each value of the systolic array output $SA_{7o}$ is (n6∈0 to 15):

$$A(0,16,n6)=I(0,16,0)\times F_{dn6}(0,0,0)+I(0,16,1)\times F_{dn6}(0,0,1)+\ldots+I(0,16,15)\times F_{dn6}(0,0,15) \quad (16);$$

$$A(0,17,n6)=I(0,17,0)\times F_{dn6}(0,0,0)+I(0,17,1)\times F_{dn6}(0,0,1)+\ldots+I(0,17,15)\times F_{dn6}(0,0,15) \quad (17).$$

$$A(0,27,n6)=I(0,27,0)\times F_{dn6}(0,0,0)+I(0,27,1)\times F_{dn6}(0,0,1)+\ldots+I(0,27,15)\times F_{dn6}(0,0,15) \quad (18);$$

and the rest may be deduced by analogy, so there will be no repetition. In addition, the systolic array output $SA_{6o}$ of FIG. 14A is a completed output 141, and the systolic array output $SA_{7o}$ is a currently processed output 142.

Figure 14C:
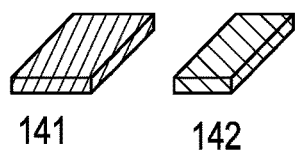
Figure 14C:
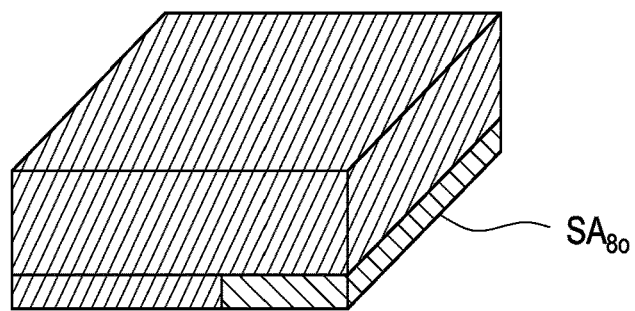

For another example, FIG. 14C is a schematic diagram of a systolic array output $SA_{8o}$ according to an embodiment of the disclosure. Referring to FIG. 14A, table (11) is data of the second output data stored in the second buffer memory 171:

TABLE 11

| I(2, 16, 15) | I(2, 16, 14) | ... | I(2, 16, 1) | I(2, 17, 0) |
|---|---|---|---|---|
| I(2, 17, 15) | I(2, 17, 14) | ... | I(2, 17, 1) | I(2, 17, 0) |
| ... | ... | ... | ... | ... |
| I(2, 27, 15) | I(2, 27, 14) | ... | I(2, 27, 1) | I(2, 27, 0) |

Table (12) shows the systolic array output:

TABLE 12

| A(2, 16, 0) | A(2, 16, 1) | ... | A(2, 16, 14) | A(2, 16, 15) |
|---|---|---|---|---|
| A(2, 17, 0) | A(2, 17, 1) | ... | A(2, 17, 14) | A(2, 17, 15) |
| ... | ... | ... | ... | ... |
| A(2, 27, 0) | A(2, 27, 1) | ... | A(2, 27, 14) | A(2, 27, 15) |

Therefore, each value of the systolic array output $SA_{8o}$ of the last currently processed output 142 is (n6∈0 to 15):

$$A(2,16,n6)=I(2,16,0)\times F_{dn6}(0,0,0)+I(2,16,1)\times F_{dn6}(0,0,1)+\ldots+I(2,16,15)\times F_{dn6}(0,0,15) \quad (19)$$

$$A(2,17,n6)=I(2,17,0)\times F_{dn6}(0,0,0)+I(2,17,1)\times F_{dn6}(0,0,1)+\ldots+I(2,17,15)\times F_{dn6}(0,0,15) \quad (20).$$

$$A(2,27,n6)=I(2,27,0)\times F_{dn6}(0,0,0)+I(2,27,1)\times F_{dn6}(0,0,1)+\ldots+I(2,27,15)\times F_{dn6}(0,0,15) \quad (21),$$

and the rest may be deduced by analogy, so there will be no repetition.

In an embodiment, when the third computing device 175 is running the third computation, the first computing device 135 and the second computing device 155 continuously respectively run the first computation and the second computation. In other words, if the first computing device 135 and the second computing device 155 have not completed the computation of all the input data, the computation by the first computing device 135, the second computing device 155, and the third computing device 175 may be performed together.

Referring to FIG. 2, lastly, the third computing device 175 outputs the third output data obtained by the third computation to the memory 110 (Step S290).

Figure 15:
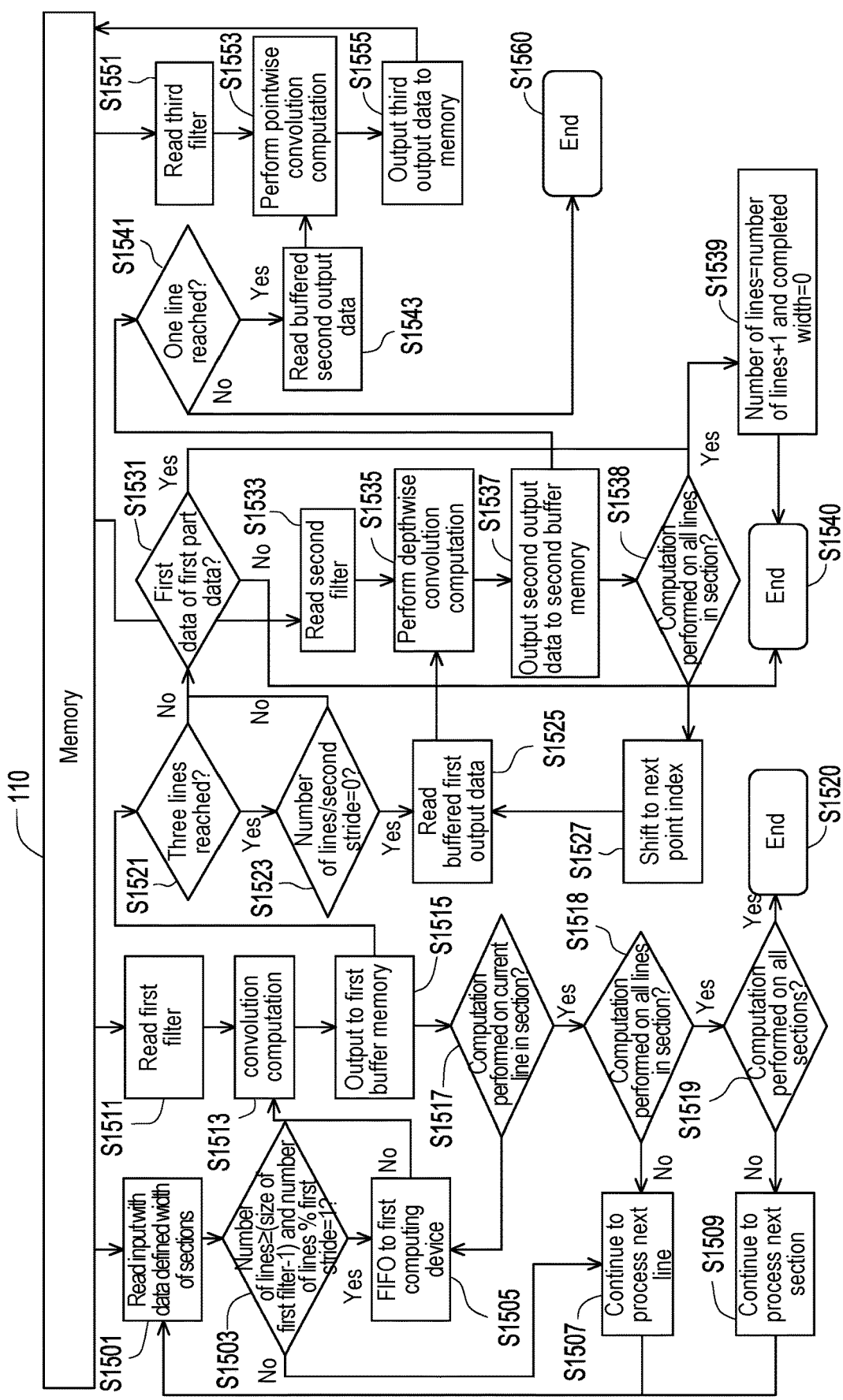
FIG. 15 is a flowchart of a data processing method with the MobileNet architecture according to an embodiment of the disclosure.

In order to facilitate the understanding of the complete process, another embodiment is described below. FIG. 15 is a flowchart of a data processing method with the MobileNet architecture according to an embodiment of the disclosure. Referring to FIG. 15, the first computing device 135 reads data with defined width of sections from the input data in the memory 110 to serve as the first part data (Step S1501). The first computing device 135 judges whether a number of currently processed lines is greater than or equal to a number which is the size of the first filter-1 and whether a remainder obtained by dividing the number of lines by a first stride used in the first computation is 1 (Step S1503). If the condition of Step S1503 is met, the first FIFO unit 132 sequentially outputs the first part data to the first computing device 135 (Step S1505). The first computing device 135 reads a weight of the first filter used in the convolution computation from the memory 110 (Step S1511), performs the convolution computation (Step S1513), and outputs the obtained first output data to the first buffer memory 151 (Step S1515). The first computing device 135 judges whether the convolution computation has been performed on all data of a current line (whose size is the same as the size of the filter) in a current section (Step S1517). If the convolution computation of the data has not been completed, the first FIFO unit 132 continues to output the first part data to the first computing device 135 (Step S1505). If the convolution computation has been performed on all the data in the line, the first computing device 135 judges whether the convolution computation has been performed on all data of all lines in the current section (Step S1518). If the convolution computation of the data of one or more lines in the current section has not been completed or the condition of Step S1503 is met, the first computing device 135 continues to process data of a next line from the input data in the memory 110 (Step S1507). If the convolution computation has been performed on all the data of each line in the current section, the first computing device 135 judges whether the convolution computation has been performed on all the data of all sections (Step S1519). If there is still a section that the convolution computation of the data has not been completed, the first computing device 135 continues to process the data of the next section (Step S1509). In addition, the first computing device 135 resets the number of currently processed lines to zero, and sets the currently processed width to: an original width+the width of the section—(first stride used in the first computation—1+a second stride used in the second computation—1). If the convolution computation has been performed on all the data of all the sections, the first computing device 135 completes all the convolution computation on the input data (Step S1520).

The second computing device 155 judges whether the first output data buffered in the first buffer memory 151 is greater than the first predetermined data amount (Step S1521). Taking the size of the second filter as 3×3 as an example, the second computing device 155 judges whether there are three lines of the buffered first output data. The second computing device 155 judges whether a remainder obtained by dividing the number of lines processed in the first computation by the second stride used in the second computation is equal to zero (Step S1523). If the remainder is zero, the second computing device 155 reads the buffered first output data to serve as the second part data (Step S1525).

If Step S1521 and Step S1523 do not meet the condition, the second computing device 155 judges whether the currently processed data is the first data of the first part data (Step S1531). If the condition is not met in Step S1531, all the second computation is ended (Step S1540). On the other hand, the second computing device 155 reads a weight of the second filter used in the depthwise convolution computation from the memory 110 (Step S1533), performs the depthwise convolution computation (Step S1535), and outputs the obtained second output data to the second buffer memory 171 (Step S1537). The second computing device 155 judges whether the depthwise convolution computation has been performed on all data of all lines in a current section (Step S1538). If the convolution computation of the data of one or more lines in the current section has not been completed, the second computing device 155 shifts to a next point index (for example, the second stride apart) (Step S1527) and processes next data until the depthwise convolution computation has been performed on all the data of all the lines in the first buffer memory 151, and the second computing device 155 sets the number of currently processed lines to: an original number of lines+1, and resets a currently processed width to zero (Step S1539). Then, the second computing device 155 completes all the depthwise convolution computation on the second input data (Step S1540).

The third computing device 175 judges whether the second output data buffered in the second buffer memory 171 has reached one line of the second output data (Step S1541). The third computing device 175 reads the buffered second output data to serve as the third part data (Step S1543). The third computing device 175 reads a weight of the third filter used in the pointwise convolution computation (Step S1551) from the memory 110, performs the pointwise convolution computation (Step S1553), and outputs the obtained third output data to the memory 110 (Step S1555). The third computing device 175 judges whether the pointwise convolution computation has been performed on all data of all lines in the second buffer memory 171. If the pointwise convolution computation of the data has not been completed, the second FIFO unit 172 continues to output the third part data to the third computing device 175. If the pointwise convolution computation of all the data of all the lines in the second buffer memory 171 has been completed, the third computing device 175 completes all the pointwise convolution computation on the third part data (Step S1560).

The embodiment of the disclosure further provides a non-transitory computer readable storage medium (for example, a storage medium such as a hard disk, an optical disk, a flash memory, and a solid state disk (SSD)), which is used to store a program code. The computing circuit 100 or other processors may load the program code, so as to execute corresponding processes of one or more data processing methods according to the embodiments of the disclosure. Reference may be made to the above description for the processes and will not be repeated here.

In summary, in the computing circuit and the data processing method based on the convolutional neural network and the computer readable storage medium of the embodiments of the disclosure, the first output data and/or the second output data are buffered without being output to the memory, and when the buffered data meets the size required for the second computation and/or the third computation, the second computation and/or the third computation may be started. In this way, the number of accesses of the memory can be reduced, and the computing efficiency can be improved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A data processing method based on a convolutional neural network (CNN), comprising:
    reading, through a processing element, input data from a memory;
    performing, through the processing element, a first computation on first part data of the input data to obtain first output data, wherein a CNN structure is configured with the first computation, a second computation, and a third computation, the first computation is configured with a first filter, and a size of the first output data is related to a size of the first filter of the first computation and a size of the first part data;
    buffering, through the processing element, the first output data to a first buffer;
    performing, through the processing element, the second computation on the first output data to obtain second output data when the first output data buffered in the first buffer is greater than a first predetermined data amount, wherein the second computation is configured with a second filter, and a size of the second output data is related to a size of the second filter of the second computation;
    buffering, through the processing element, the second output data to a second buffer; and
    outputting, through the processing element, third output data obtained by performing the third computation on the second output data to the memory, wherein
    when performing the second computation on the first output data, the first computation is continuously performed on the input data, wherein
    a height of the second filter is $H_{kd}$, a width of the second filter is $W_{kd}$, a height of the first output data is $H_{f1o}$, a width of the first output data is $W_{f1o}$, and $H_{kd}$, $W_{kd}$, $H_{f1o}$, and $W_{f1o}$ are positive integers;
    a height formed by a maximum data amount buffered in the first buffer is $M_H \times H_{f1o}$ and a width formed is $M_W \times W_{f1o}$, and $M_H$ and $M_W$ are multiples and positive integers; and
    when the first output data buffered in the first buffer is greater than the first predetermined data amount, $M_H \times H_{f1o}$ is not less than $H_{kd}$, and $M_W \times W_{f1o}$ is not less than $W_{kd}$.

2. The data processing method based on the convolutional neural network according to claim 1, wherein the second computation is different from the third computation, and buffering the second output data to the second buffer comprises:
    performing the third computation on the second output data when the second output data buffered in the second buffer is greater than a second predetermined data amount to obtain the third output data, wherein the third computation is configured with a third filter, and a size of the third output data is related to a size of the third filter.

3. The data processing method based on the convolutional neural network according to claim 2, wherein outputting the third output data obtained by performing the third computation on the second output data to the memory comprises:
continuously performing the first computation and the second computation when performing the third computation on the second output data.

4. The data processing method based on the convolutional neural network according to claim 2, wherein the third computation is a pointwise convolution computation, a height and a width of the third filter are both 1, and performing the third computation on the third input data comprises:
performing the third computation on each of the buffered second output data.

5. The data processing method based on the convolutional neural network according to claim 2, wherein performing the first computation on the first part data of the input data, performing the second computation on the first output data, or performing the third computation on the second output data comprises:
dividing the first part data into a plurality of first systolic array inputs; and
respectively performing the first computation on the first systolic array inputs to obtain a plurality of first systolic array outputs, wherein the first systolic array outputs form the first output data.

6. The data processing method based on the convolutional neural network according to claim 1, wherein the second computation is a depthwise convolution computation, and performing the second computation on the first output data comprises:
performing the second computation when the first output data buffered in the first buffer is greater than $W_{kd} \times H_{kd}$.

7. The data processing method based on the convolutional neural network according to claim 6, wherein the first computation is a convolution computation, and reading the input data from the memory comprises:
reading the first part data of the input data toward a first sliding direction, wherein the first sliding direction is parallel to a height of the input data.

8. The data processing method based on the convolutional neural network according to claim 6, wherein the first computation is a convolution computation, and reading the input data from the memory comprises:
reading the first part data of the input data toward a second sliding direction, wherein the second sliding direction is parallel to a width of the input data.

9. A non-transitory computer readable storage medium, used to store a program code, wherein a processor loads the program code to execute the data processing method based on the convolutional neural network according to claim 1.

10. A computing circuit based on a convolutional neural network, comprising:
a memory, used to store input data;
a processing element, coupled to the memory and comprising:
a first computing device, used to perform a first computation on first part data of the input data to obtain first output data, and buffer the first output data to a first buffer memory of the processing element, wherein a CNN structure is configured with the first computation, a second computation, and a third computation, the first computation is configured with a first filter, and a size of the first output data is related to a size of the first filter of the first computation and a size of the first part data;
a second computing device, used to perform the second computation on the first output data when the first output data buffered in the first buffer memory is greater than a first predetermined data amount to obtain second output data, and buffer the second output data to a second buffer memory, wherein the second computation is configured with a second filter, and a size of the second output data is related to a size of the second filter of the second computation;
the second buffer memory, used to store the second output data; and
a third computing device, used to output third output data obtained by performing the third computation on the second output data to the memory, wherein
when the second computing device performs the second computation, the first computing device continuously performs the first computation, wherein
a height of the second filter is $H_{kd}$, a width of the second filter is $W_{kd}$, a height of the first output data is $H_{f1o}$, a width of the first output data is $W_{f1o}$, and $H_{kd}$, $W_{kd}$, $H_{f1o}$, and $W_{f1o}$ are positive integers;
a height formed by a maximum data amount buffered in the first buffer is $M_H \times H_{f1o}$ and a width formed is $M_W \times W_{f1o}$, and $M_H$ and $M_W$ are multiples and positive integers; and
when the first output data buffered in the first buffer is greater than the first predetermined data amount, $M_H \times H_{f1o}$ is not less than $H_{kd}$, and $M_W \times W_{f1o}$ is not less than $W_{kd}$.

11. The computing circuit based on the convolutional neural network according to claim 10, wherein the first computing device has a first maximum computation amount in a unit time, the second computing device has a second maximum computation amount in the unit time, the third computing device has a third maximum computation amount in the unit time, the first maximum computation amount is greater than the second maximum computation amount, and the first maximum computation amount is greater than the third maximum computation amount.

12. The computing circuit based on the convolutional neural network according to claim 10, wherein when the third computing device runs the third computation, the first computing device continuously run the first computation, and the second computing device continuously run the second computation.

13. The computing circuit based on the convolutional neural network according to claim 10, wherein the first buffer memory and the second buffer memory are static random access memories.

* * * * *